(12) United States Patent
Temperley et al.

(10) Patent No.: US 10,703,914 B2
(45) Date of Patent: Jul. 7, 2020

(54) COATED PRODUCT

(71) Applicant: HUNTSMAN P&A UK LIMITED, Stockton-on-Tees, Durham (GB)

(72) Inventors: John Temperley, Sedgefield (GB); John L. Edwards, Durham (GB); John Robb, Stockton-on-Tees (GB)

(73) Assignee: HUNTSMAN P&A UK LIMITED, Stockton-on-Tees, Durham ( * ) Notice: Subject to any disclaimer, the term of this patent is extended or adjusted under 35 U.S.C. 154(b) by 132 days.

(21) Appl. No.: 15/550,026

(22) PCT Filed: Feb. 8, 2016

(86) PCT No.: PCT/GB2016/050290
§ 371 (c)(1),
(2) Date: Aug. 10, 2017

(87) PCT Pub. No.: WO2016/128723
PCT Pub. Date: Aug. 18, 2016

(65) Prior Publication Data
US 2018/0022924 A1 Jan. 25, 2018

(30) Foreign Application Priority Data
Feb. 11, 2015 (GB) .................................. 1502250.2

(51) Int. Cl.
*C09C 1/36* (2006.01)
*C09D 1/00* (2006.01)
(Continued)

(52) U.S. Cl.
CPC .............. *C09C 1/3653* (2013.01); *C08K 9/02* (2013.01); *C09D 1/00* (2013.01); *C09D 5/00* (2013.01);
(Continued)

(58) Field of Classification Search
CPC .. C09C 1/3653; C08K 9/02; C08K 2201/005; C08K 2003/2241; C09D 7/62;
(Continued)

(56) References Cited

U.S. PATENT DOCUMENTS

| 2,885,366 A | 5/1959 | Iler |
| 2006/0110317 A1 | 5/2006 | Torardi |

(Continued)

FOREIGN PATENT DOCUMENTS

| EP | 2 285 912 A1 | 2/2011 |
| GB | 2477876 A | 8/2011 |

(Continued)

OTHER PUBLICATIONS

H. Weber: "Silicic acid as a constituent of titanium dioxide pigments", Kronos Information, vol. 6.1, English translation, pp. 1-30 (1978).

Primary Examiner — Amber R Orlando
Assistant Examiner — Syed T Iqbal
(74) Attorney, Agent, or Firm — Norman B. Thot

(57) ABSTRACT

A coated particulate inorganic material includes a particulate inorganic material selected from at least one of titanium dioxide and a doped titanium dioxide, and a coating. The particulate inorganic material has an average crystal size of 0.4-2 μm. The coating includes a first and second layer. The first layer includes an inorganic oxide and/or an inorganic phosphate. The second layer is alumina. The first layer is from 0.1 to 2.2% w/w based on a total weight of the first layer with respect to a total weight of the particulate inorganic material. The second layer is 0.1 to 3.5% w/w based on a total weight of the second layer with respect to the total weight of the particulate inorganic material. The coating is from 0.2 to 4.5% w/w based on the total weight of the first
(Continued)

and second layer with respect to the total weight of the particulate inorganic material.

12 Claims, 5 Drawing Sheets

(51) Int. Cl.
*C09D 7/62* (2018.01)
*C08K 9/02* (2006.01)
*C09D 7/61* (2018.01)
*C09D 5/00* (2006.01)
*C08K 3/22* (2006.01)

(52) U.S. Cl.
CPC ............... *C09D 7/61* (2018.01); *C09D 7/62* (2018.01); *C01P 2004/62* (2013.01); *C01P 2006/60* (2013.01); *C08K 2003/2241* (2013.01); *C08K 2201/005* (2013.01)

(58) Field of Classification Search
CPC .... C09D 7/61; C09D 1/00; C09D 5/00; C01P 2004/62; C01P 2006/60
See application file for complete search history.

(56) References Cited

U.S. PATENT DOCUMENTS

| | | | |
|---|---|---|---|
| 2011/0041726 A1* | 2/2011 | Robb | ................. C01G 23/0532 106/31.13 |
| 2012/0305865 A1* | 12/2012 | Edwards | .................. C09D 7/69 252/588 |
| 2014/0073729 A1 | 3/2014 | Schmidt et al. | |

FOREIGN PATENT DOCUMENTS

| | | |
|---|---|---|
| GB | 2477931 A | 8/2011 |
| WO | WO 2011/101658 A1 | 8/2011 |

\* cited by examiner

COATED PRODUCT

CROSS REFERENCE TO PRIOR APPLICATIONS

This application is a U.S. National Phase application under 35 U.S.C. § 371 of International Application No. PCT/GB2016/050290, filed on Feb. 8, 2016 and which claims benefit to Great Britain Patent Application No. 1502250.2, filed on Feb. 11, 2015. The International Application was published in English on Aug. 18, 2016 as WO 2016/128723 A1 under PCT Article 21(2).

FIELD

The present invention relates to coated titanium dioxide particulate materials and products containing these materials.

BACKGROUND

Materials having high reflectance and reduced absorption in the near infrared region (NIR) of the electromagnetic spectrum (between 700 and 2500 nm) may be advantageous in many applications. For instance, products made from such materials tend to remain cooler under solar illumination and the lower temperatures can result in lower thermal degradation, improved durability, greater comfort, lower air conditioning costs, and reduced environmental impact.

High solar reflectance may be achieved in different ways. For instance, items with white outer surfaces may have high solar reflectance, however, this approach is unsatisfactory if a color is desired. For example, high solar reflectance and reduced absorption in the near infrared region may be achieved by combining conventional titanium dioxide pigments with non-NIR absorbing colored pigments and dyes.

When titanium dioxide containing products such as paints and plastic products are exposed to the sun, however, it is important that the product lifetime is not unduly curtailed due to deterioration following the sun exposure.

It is known that such outdoor/sun-exposed products containing titanium dioxide and other pigment fillers may not be photostable and can prematurely deteriorate via photochemical and photocatalytic reactions.

Although titanium dioxide itself does not degrade, the extent to which an item containing titanium dioxide degrades may depend upon the photocatalytic activity of the titanium dioxide pigment used in the item.

A coating layer of certain inorganic materials may be applied to titanium dioxide particles and pigment particles in order to reduce the photocatalytic activity. A coating with a silica layer may, for example, reduce the photocatalytic activity of titanium dioxide particles.

A dense or a fluffy $SiO_2$ layer can be applied to titanium dioxide particles, e.g., such as described in: H. Weber, "Silicic acid as a constituent of titanium dioxide pigments", Kronos Information 6.1 (1978). Coating with inorganic oxides, such as $SiO_2$, $ZrO_2$, $SnO_2$, $Al_2O_3$, etc., can increase the photostability of $TiO_2$ particles. An outer $Al_2O_3$ layer may improve dispersion of the particles in the end matrix.

One skilled in the art would expect a higher level of a dense silica coating layer to result in a greater reduction in the titanium dioxide pigment's photocatalytic activity. Levels of coating on the titania at amounts as high as 10 or 20 w/w % have been contemplated.

Current commercial products (e.g., those with a particle size of from 0.25 to 0.32 microns) may be coated with a minimum of at least 3 or 3.5 w/w % silica (or other inorganic oxide), together with at least 2 w/w % alumina.

High levels of the dense silica coatings have also been used to treat larger titanium dioxide particles. US 2014/0073729 A1, for example, describes doped titanium dioxide pigment particles having a mean particle size of from 0.4 to 1.0 microns. These particles are subjected to an inorganic surface treatment and/or organic surface treatment. The titanium dioxide particles are in particular coated with a 3 w/w % level of silica followed by coating with a 3 w/w % level of alumina.

EP 2 285 912 describes a coated particulate titanium dioxide material, wherein the material has an average crystal size of greater than 0.40 microns. The coating comprises one or more oxide material, for example, silica. In one example, 3% silica and 2% alumina are used to coat the particulate material.

Components of paints and products used in outdoor applications are becoming more photostable, but the cost of treating filler particles with coatings to make them suitable for such applications increases the cost of products.

There is a continuing need for inorganic particulate materials, such as titanium dioxide particles, with ultra-low photocatalytic activity to assist longer product lifetime of items exposed to the sun.

SUMMARY

An aspect of the present invention is to provide coatings, for example, paints, that comprise inorganic particulate materials, such as titanium dioxide particles, where the coatings retain good durability when exposed to the elements over time.

In an embodiment, the present invention provides a coated particulate inorganic material which includes a particulate inorganic material selected from at least one of titanium dioxide and a doped titanium dioxide, and a coating on the particulate inorganic material. The particulate inorganic material has an average crystal size of from 0.4 µm to 2 µm. The coating comprises a first layer and a second layer. The first layer comprises at least one of at least one inorganic oxide and at least one inorganic phosphate. Each of the at least one inorganic oxide is independently selected from an oxide of group 4 (IVB) and group 12 (IIB) transition metals selected from Ti, Zr and Zn, group 13 to group 15 (IIIA-VA) p-block elements selected from Si, P and Sn, and lanthanides. Each of the at least one inorganic phosphate is independently selected from a phosphate of group 1 (IA) alkali metals and group 2 (IIA) alkaline earth metals selected from H, Li, Na, K, Rb, Be, Mg, Ca and Sr, group 3 (IIIA) and group 4 (IVB) transition metals selected from Sc, Y, Ti and Zr, and group 13 to group 15 (IIIA-VA) p-block elements selected from Al, Ga, In, Tl, Ge, Sn and Pb. The second layer is alumina. The first layer on the particulate inorganic material is from 0.1 to 2.2% w/w based on a total weight of the first layer with respect to a total weight of the particulate inorganic material. The second layer on the particulate inorganic material is 0.1 to 3.5% w/w based on a total weight of the second layer with respect to the total weight of the particulate inorganic material. The coating on the particulate inorganic material is from 0.2 to 4.5% w/w based on the total weight of the first layer and the total weight of the second layer with respect to the total weight of the particulate inorganic material.

BRIEF DESCRIPTION OF THE DRAWINGS

The present invention is described in greater detail below on the basis of embodiments and of the drawings in which.

DETAILED DESCRIPTION

Figure 1:
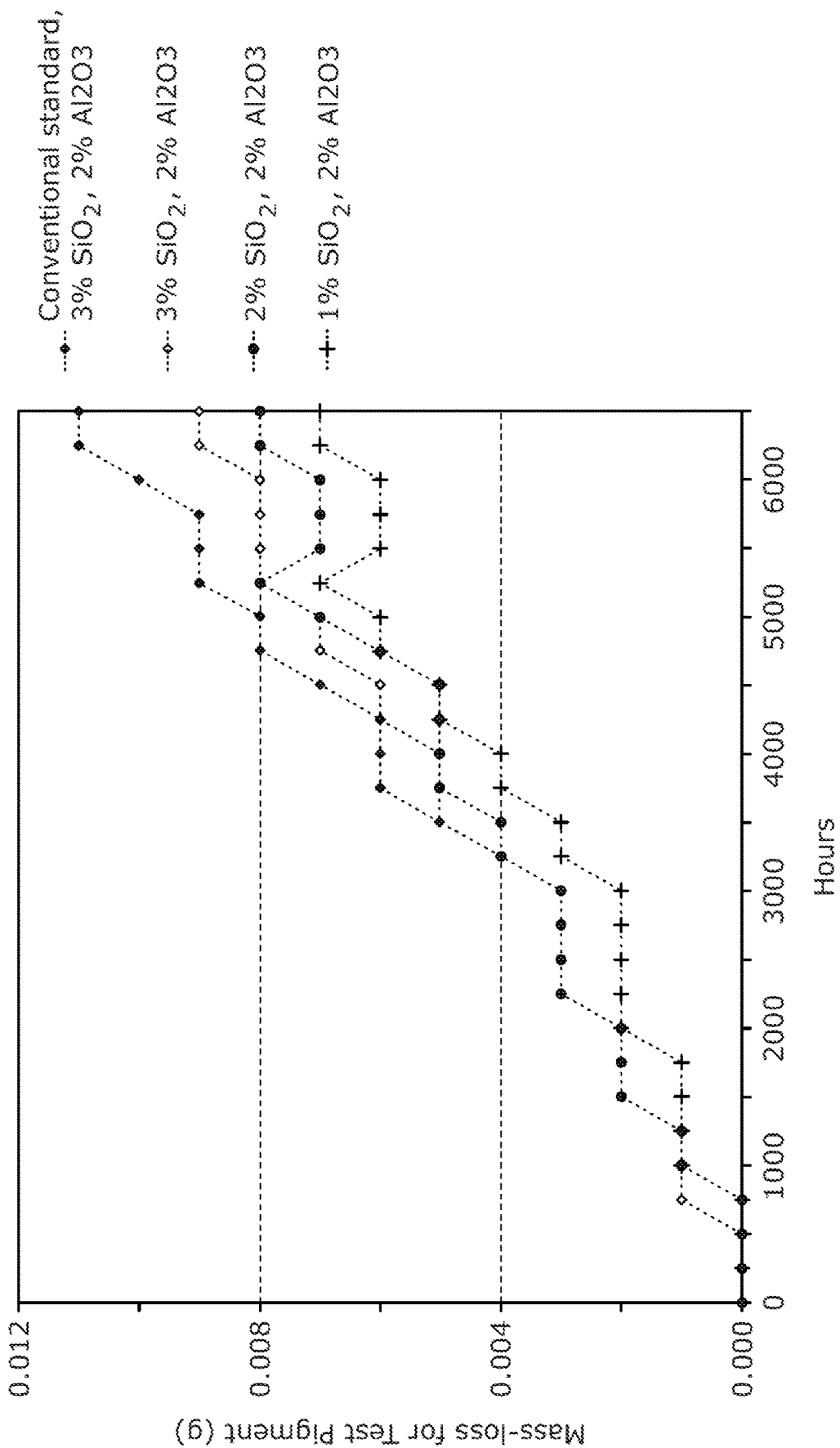
FIG. 1 is a graph showing the mass-loss over time for the four samples of coated titania as obtained in Example 1 when tested in PVDF acrylic based paint.

The present invention provides, in a first aspect, a coated particulate inorganic material comprising:
(i) a particulate inorganic material selected from titanium dioxide, doped titanium dioxide and combinations thereof, wherein the particulate inorganic material has an average crystal size of from 0.4 µm to 2 µm; and
(ii) a coating on the particulate inorganic material, the coating comprising a first layer and a second layer,
wherein the material for the first layer is one or more material selected from inorganic oxides and inorganic phosphates,
with the (or each) inorganic oxide being independently selected from an oxide of:
(a) group 4 (IVB) and 12 (IIB) transition metals selected from Ti, Zr and Zn; and
(b) group 13 to 15 (IIIA-VA) p-block elements selected from Si, P and Sn; and
(c) lanthanides;
with the (or each) inorganic phosphate being independently selected from a phosphate of:
(i) group 1 (IA) and 2 (IIA) alkali and alkaline earth metals selected from H, Li, Na, K, Rb, Be, Mg, Ca and Sr; and
(ii) group 3 (IIIA) and 4 (IVB) transition metals selected from Sc, Y, Ti and Zr; and
(iii) group 13 to 15 (IIIA-VA) p-block elements selected from Al, Ga, In, Tl, Ge, Sn and Pb;
and wherein the material for the second layer is alumina;
wherein the amount of the first layer on the particulate inorganic material is from 0.1 to 2.2% w/w, when considering the total weight of the first layer material with respect to the total weight of the particulate inorganic material, and wherein the amount of the second layer on the particulate inorganic material is 0.1 to 3.5% w/w when considering the total weight of the second layer material with respect to the total weight of the particulate inorganic material, and wherein the total amount of coating is from 0.2 to 4.5% w/w when considering the total weight of the first and second layer material with respect to the total weight of the particulate inorganic material.

In relation to these titanium dioxide pigments with larger particle sizes (0.4-2 microns) which are useful for scattering the near infrared part of the electromagnetic spectrum, it has surprisingly been determined that the widely held assumption that a higher level of inorganic oxide (e.g., silica) coating leads to a better level of photostability does not apply. The present invention has in fact determined that a much lower amount of anti-photocatalytic coating can give an equivalent or lower photocatalytic activity compared to a higher level of the inorganic oxide coating layer.

An improved durability product can therefore be obtained by reducing the effect coating to be within a range that has been determined to be the most effective.

US 2014/0073729 describes that the titanium dioxide particles are coated with a 3 w/w % level of silica followed by coating with a 3 w/w % level of alumina, so that a 6% total level of coating results. In EP 2 285 912 describes that the titanium dioxide particles are coated with 3% silica and 2% alumina, so that a 5% total level of coating results. Both the levels of the first layer and the levels of total coating are therefore different from the present invention.

In the present invention, it has surprisingly been determined that it is not the highest level of coating or the lowest level of coating that gives the best result. Instead, there clearly is a range of coating levels, both in terms of the individual coatings and the total coating level, within which the best results are achieved.

The relatively low amounts of coating within this claimed range lead to improved effects and more photostable systems.

It would not have been predicted that there would be an optimal range of coating level, to get the best results in terms of more photostable systems, where this optimal range involves use of coating amounts that are significantly less than the conventional coating levels used in the art.

The prior art fails to disclose or suggest that the selection of specific amounts and types of coating materials for titanium dioxide pigments with larger particle sizes, where this is not simply a matter of applying an increased amount of coating to obtain an improved effect, would lead to the best results in terms of lowered photocatalytic activity.

The present invention therefore relates to a coated particulate material that has high durability combined with optical properties in the near infrared that are superior to those that could have been anticipated or predicted from the prior art.

The present invention also allows opacity to be provided to surfaces where photocatalytic activity would render existing titanium dioxide products unsuitable (e.g., fluoropolymer surfaces).

In a second aspect, the present invention provides the use of a coating on a particulate inorganic material to lower the photocatalytic activity of the material, wherein,
(i) the particulate inorganic material is selected from titanium dioxide, doped titanium dioxide and combinations thereof, wherein the particulate inorganic material has an average crystal size of from 0.4 µm to 2 µm; and
(ii) the coating on the particulate inorganic material comprises a first layer and a second layer,
wherein the material for the first layer is one or more material selected from inorganic oxides and inorganic phosphates,
with the (or each) inorganic oxide being independently selected from an oxide of:
(a) group 4 (IVB) and 12 (IIB) transition metals selected from Ti, Zr and Zn; and
(b) group 13 to 15 (IIIA-VA) p-block elements selected from Si, P and Sn; and
(c) lanthanides;
with the (or each) inorganic phosphate being independently selected from a phosphate of:

(i) group 1 (IA) and 2 (IIA) alkali and alkaline earth metals selected from H, Li, Na, K, Rb, Be, Mg, Ca and Sr; and
(ii) group 3 (IIIA) and 4 (IVB) transition metals selected from Sc, Y, Ti and Zr; and
(iii) group 13 to 15 (IIIA-VA) p-block elements selected from Al, Ga, In, Tl, Ge, Sn and Pb;

and wherein the material for the second layer is alumina; wherein the amount of the first layer on the particulate inorganic material is from 0.1 to 2.2% w/w, when considering the total weight of the first layer material with respect to the total weight of the particulate inorganic material, and wherein the amount of the second layer on the particulate inorganic material is 0.1 to 3.5% w/w when considering the total weight of the second layer material with respect to the total weight of the particulate inorganic material, and wherein the total amount of coating is from 0.2 to 4.5% w/w when considering the total weight of the first and second layer material with respect to the total weight of the particulate inorganic material.

In a third aspect, the present invention provides a product comprising the coated inorganic particulate material in accordance with the first aspect together with a carrier.

In an embodiment, the product is one that is exposed to the sun during use, the product comprising the coated inorganic particulate material in accordance with the first aspect.

In an embodiment, the product is provided with a carrier that is a resin or a binder or the like.

In an embodiment, the product is a paint and the carrier is a resin.

It is beneficial to use a resin with an attenuation coefficient at 300 nm of below 0.02/micron, e.g. from 0.00001 to 0.02/micron, such as from 0.0001 to 0.02/micron. Attenuation coefficients can be calculated using the Beer Lambert equation.

An attention coefficient for a resin may in particular be determined as follows:
1) Clear unpigmented resin is drawn down on quartz microscope slides such that the dried resin thickness is around 40 microns and the microscope slide thickness is around 1000 microns. (NB Quartz microscope slides are transparent between 300-400 nm).
2) The transmission spectra of the slides is measured over the range 300-400 nm using a spectrometer. (This may, for example, be effected using a Cary 5000 UV/Vis/NIR spectrometer in transmittance mode with an integrating sphere).
3) The actual thickness of the dry resin is measured using a probe (e.g., via the magnetic induction method and/or the eddy current method. This may, for example, be effected using a Fischer Dualscope® FMP100).
4) The attenuation coefficient of the film (in reciprocal microns) is then calculated using the Beer Lambert equation:

[natural log(% transmittance of uncoated slide/% transmittance of resin coated slide)]/dry film thickness.

This attenuation coefficient value represents the proportion of radiation attenuated by each micron of film thickness. The higher the value, the poorer the transmission.

In the present invention, it has been determined that the best results are obtained for paint products that use coated large crystal $TiO_2$, wherein the levels of coating are low (as discussed above) and wherein the resin has low transmission. Surprisingly good results are obtained by selecting large crystal $TiO_2$, then selecting an effect coating to coat the large crystal $TiO_2$ but at a lower level than conventionally used, and then selecting to use this in a paint system where the resin has a low transmission. Such a product has surprisingly lowered photocatalytic activity.

The coated products of the first aspect are thus particularly beneficial in those systems that don't absorb much UV; these can be identified by the level of UV transmission.

The present invention thus provides particular significant benefits when the coated products are used with resins having attenuation coefficient at 300 nm of below 0.02/micron. This leads to particularly and surprisingly durable products.

In an embodiment, the present invention therefore provides a paint comprising the coated inorganic particulate material in accordance with the first aspect together with a resin, wherein the resin with an attenuation coefficient at 300 nm of below 0.02/micron, e.g., from 0.00001 to 0.02/micron, such as from 0.0001 to 0.02/micron.

Beneficial results are in particular seen when using a resin with an attenuation coefficient at 300 nm of below 0.015/micron, e.g., from 0.00001 to 0.015/micron, such as from 0.0001 to 0.015/micron. In an embodiment, the resin used is one with an attenuation coefficient at 300 nm of below 0.01/micron, e.g., from 0.00001 to 0.01/micron, such as from 0.0001 to 0.01/micron.

The present invention also provides, in a fourth aspect, the use of a material in accordance with the first aspect to improve the durability and/or lifetime of a product that is exposed to the sun during use.

In an embodiment, the product is a paint and the carrier is a resin.

As discussed above, it is beneficial to use a resin with an attenuation coefficient at 300 nm of below 0.02/micron, e.g. from 0.00001 to 0.02/micron, such as from 0.0001 to 0.02/micron.

In a fifth aspect, the present invention provides a method of preparing a coated particulate inorganic material comprising:
(i) providing a particulate inorganic material, wherein the particulate inorganic material is selected from titanium dioxide, doped titanium dioxide and combinations thereof, wherein the particulate inorganic material has an average crystal size of from 0.4 μm to 2 μm; and
(ii) applying a coating on the particulate inorganic material,
wherein the coating on the particulate inorganic material comprises a first layer and a second layer,
wherein the material for the first layer is one or more material selected from inorganic oxides and inorganic phosphates,
with the (or each) inorganic oxide being independently selected from an oxide of:
(a) group 4 (IVB) and 12 (IIB) transition metals selected from Ti, Zr and Zn; and
(b) group 13 to 15 (IIIA-VA) p-block elements selected from Si, P and Sn; and
(c) lanthanides;
with the (or each) inorganic phosphate being independently selected from a phosphate of:
(i) group 1 (IA) and 2 (IIA) alkali and alkaline earth metals selected from H, Li, Na, K, Rb, Be, Mg, Ca and Sr; and
(ii) group 3 (IIIA) and 4 (IVB) transition metals selected from Sc, Y, Ti and Zr; and
(iii) group 13 to 15 (IIIA-VA) p-block elements selected from Al, Ga, In, Tl, Ge, Sn and Pb;

and wherein the material for the second layer is alumina;

wherein the amount of the first layer on the particulate inorganic material is from 0.1 to 2.2% w/w, when considering the total weight of the first layer material with respect to the total weight of the particulate inorganic material, and wherein the amount of the second layer on the particulate inorganic material is 0.1 to 3.5% w/w when considering the total weight of the second layer material with respect to the total weight of the particulate inorganic material, and wherein the total amount of coating is from 0.2 to 4.5% w/w when considering the total weight of the first and second layer material with respect to the total weight of the particulate inorganic material.

When reference is made in any aspect of the present invention to there being a coating that comprises a first layer and a second layer, the present invention does not necessarily require that these two layers are completely distinct and separate.

It may instead be that the two layers are, at least to an extent, mixed together. This may in particular occur in embodiments where the techniques used to apply the two layers are such that the coating occurs in a single stage.

It may be, for example, that there is a concentration gradient, with the first coating layer material being more concentrated towards the surface of the particulate inorganic material, and with the second coating layer material being more concentrated away from the surface of the particulate inorganic material.

In other instances, it may, however, be that the two layers are completely distinct and separate, or that there is relatively little overlap or mixing between the two layers.

In some embodiments, the first coating layer may be applied in a first stage, and then the second coating layer is applied in a second stage. The two layers may be substantially distinct and separate in such embodiments.

The coated product thus has both the first coating layer material (which is selected from inorganic oxides and phosphates, as set out herein) and has the second coating layer material, which is alumina. This coating may be present on the particulate inorganic material in the amounts described herein.

The coating material that is immediately at the surface of the particulate inorganic material (i.e., at the interface with the particulate inorganic material) can, for example, be substantially 100% first coating layer material. Alternatively, the coating material that is immediately at the surface of the particulate inorganic material may be comprised of at least 50 wt % of the first coating layer material (such as from 50 to 99.9%); e.g., 75 wt % or more of the coating material at the surface of the particulate inorganic material may be coated with the first coating layer material, such as 80 wt % or more, or 90 wt % or more, or 95 wt % or more.

The coating material that is at the outer surface of the coating can, for example, be the second coating layer material. Alternatively, the coating material that is at the outer surface of the coating may be comprised of at least 50 wt % of the second coating layer material (such as from 50 to 99.9%), e.g., 75 wt % or more of the coating material at the outer surface of the coating may be the second coating layer material, such as 80 wt % or more, or 90 wt % or more, or 95 wt % or more.

DETAILED DESCRIPTION

The coated particulate material of the present invention comprises a particulate inorganic material, wherein the particulate inorganic material is selected from titanium dioxide, doped titanium dioxide and combinations thereof, and wherein the material has an average crystal size of from 0.4 µm to 2 µm. This is thus a large crystal size pigment useful for scattering the near infrared part of the electromagnetic spectrum.

In an embodiment, the inorganic particulate material can, for example, have an average crystal size greater than 0.45 µm. The particles can, for example, have an average crystal size of greater than 0.50 µm, e.g., greater than 0.55 µm. The average crystal size can, for example, be greater than 0.60 µm, e.g. 0.65 µm or greater, for example, 0.70 µm or greater, such as 0.75 µm or greater, e.g., 0.80 µm or greater.

In an embodiment, the inorganic particulate material can, for example, have an average crystal size of up to 2.0 µm. For example, the particles may have an average crystal size of up to 1.9 µm, e.g., up to 1.8 µm. It may be that the average crystal size is up to 1.7 µm, e.g., up to 1.6 µm, or up to 1.5 µm.

In an embodiment, the inorganic particulate material can, for example, have an average crystal size from 0.40 to 2 µm, or from 0.45 to 2 µm, or from 0.50 to 2 µm, or from 0.55 to 2 µm, or from 0.60 to 2 µm, or from 0.65 to 2 µm, or from 0.70 to 2 µm, or from 0.75 to 2 µm, or from 0.80 to 2 µm.

In an embodiment, the inorganic particulate material can, for example, have an average crystal size from 0.40 to 1.75 µm, or from 0.45 to 1.75 µm, or from 0.50 to 1.75 µm, or from 0.55 to 1.75 µm, or from 0.60 to 1.75 µm, or from 0.65 to 1.75 µm, or from 0.70 to 1.75 µm, or from 0.75 to 1.75 µm, or from 0.80 to 1.75 µm.

In an embodiment, the inorganic particulate material can, for example, have an average crystal size from 0.40 to 1.5 µm, or from 0.45 to 1.5 µm, or from 0.50 to 1.5 µm, or from 0.55 to 1.5 µm, or from 0.60 to 1.5 µm, or from 0.65 to 1.5 µm, or from 0.70 to 1.5 µm, or from 0.75 to 1.5 µm, or from 0.80 to 1.5 µm.

In an embodiment, the inorganic particulate material can, for example, have an average crystal size from 0.45 to 1.5 µm, or from 0.45 to 1.45 µm, or from 0.45 to 1.4 µm, or from 0.45 to 1.3 µm. In an embodiment, the inorganic particulate material can, for example, have an average crystal size from 0.5 to 1.5 µm, or from 0.5 to 1.45 µm, or from 0.5 to 1.4 µm, or from 0.5 to 1.3 µm. In an embodiment, the inorganic particulate material can, for example, have an average crystal size from 0.6 to 1.5 µm, or from 0.6 to 1.45 µm, or from 0.6 to 1.4 µm, or from 0.6 to 1.3 µm. In an embodiment, the inorganic particulate material can, for example, have an average crystal size from 0.7 to 1.5 µm, or from 0.7 to 1.45 µm, or from 0.7 to 1.4 µm, or from 0.7 to 1.3 µm.

The inorganic particulate material can, for example, have an average crystal size from 0.6 to 1.4 µm, or from 0.7 to 1.4 µm, or from 0.8 to 1.4 µm; e.g., from 0.6 to 1.3 µm, or from 0.7 to 1.3 µm, or from 0.8 to 1.3 µm; such as from 0.6 to 1.2 µm, or from 0.7 to 1.2 µm, or from 0.8 to 1.2 µm.

Average crystal size may be determined by transmission electron microscopy on a rubbed out sample with image analysis of the resulting photograph (e.g., using a Quantimet 570 Image Analyser). This may be validated by reference to the latex NANOSPHERE™ size standard 3200 from NIST with a certified size of 199+/−6 nm.

Conventional rutile $TiO_2$ has an average crystal size of from 0.17 to 0.29 µm, whilst conventional anatase $TiO_2$ has an average crystal size of from 0.10 to 0.25 µm.

Crystal size is distinct from particle size. The particle size depends on the effectiveness of the dispersion of the pigment in the system within which it is used. Particle size is determined by factors such as crystal size and milling techniques, e.g., dry, wet or incorporative milling. The particle size of conventional rutile $TiO_2$ is from 0.25 to 0.40 µm, whilst conventional anatase $TiO_2$ has a particle size of from 0.20 to 0.40 µm. Larger particle sizes can result if the techniques used are such that crystals "clump" together.

In the present invention, the particulate material can, for example, have an average particle size, as determined by X-ray sedimentation, of greater than 0.4 µm. For example, the average particle size may be greater than 0.4 µm and up to 2 µm, or greater than 0.4 µm and up to 1.8 µm, or greater than 0.4 µm and up to 1.7 µm, or greater than 0.4 µm and up to 1.5 µm. The average size can, for example, be greater than or equal to 0.45 µm, such as from 0.45 to 2 µm, e.g. from 0.50 to 1.8 µm, or from 0.60 to 1.5 µm or from 0.70 to 1.3 µm or from 0.80 to 1.2 µm.

In an embodiment, the inorganic particulate material used has a particle size distribution such that 30% or more of the particles are less than 1.5 micron. This may be measured by using a Brookhaven X-ray disk centrifuge. In another embodiment, the inorganic particulate material used has a particle size distribution such that 30% or more of the particles are less than 1 micron.

As noted above, the particulate inorganic material is selected from titanium dioxide, doped titanium dioxide and combinations thereof. Titanium dioxide can be prepared by any known method. For example, the so-called "sulphate" route or the so-called "chloride" route may be used, which are the two routes in wide commercial use. Equally, the fluoride process, hydrothermal processes, aerosol processes or leaching processes may be used to prepare the titanium dioxide.

The titanium dioxide may be in either the rutile or anatase crystal form. In the present invention, the rutile crystal form can, for example, be used because of its higher refractive index. In an embodiment, the titanium dioxide is 50% or more by weight rutile, such as 60% or more, e.g., 70% or more, for example, 80% or more, for example, 90% or more, for example, 95% or more, such as 99% or more, for example 99.5% or more.

The titanium dioxide may be white or translucent or may be colored. In one embodiment, it may be substantially white; for example, it may have a lightness value L* (CIE L*a*b* color space) of greater than 95, with a value of a* of less than 5 and a value of b* of less than 5.

The titanium dioxide may include impurities, e.g., up to a level of 20 wt %, especially 15 wt % or less, or 10 wt % or less; such as 8 wt % or less, e.g. 5 wt % or less. These impurities result from incomplete purification and may, for example, be iron, silica, niobia or other impurities typically present in titanium dioxide bearing feedstocks. In an embodiment, the titanium dioxide may include impurities up to a level of 0.5 wt % or less, such as 0.1 wt % or less, e.g. 0.01 wt % or less; these impurities may, for example, be iron, phosphorous, niobia or other impurities typically present in titanium dioxide bearing feedstocks.

The titanium dioxide can, for example, have a $TiO_2$ content of 90 wt % or higher, such as 92 wt % or higher, for example 93 wt % or higher. The titanium dioxide can, for example, have a $TiO_2$ content of 95 wt % or higher, such as 99 wt % or higher, for example 99.5 wt % or higher.

In an embodiment, the particulate material is or comprises a doped titanium dioxide, that is to say an inorganic material containing $TiO_2$. The doped titanium dioxide may have a $TiO_2$ content of 10 wt % or more, for example, 12 wt % or more, such as 25 wt % or more, or 40 wt % or more. The doped titanium dioxide can, for example, have a $TiO_2$ content of 50 wt % or more, for example, 60 wt % or more.

The doped titanium dioxide may be in either the rutile or anatase crystal form. The doped titanium dioxide can, for example, possess the rutile crystal structure. As the skilled person will appreciate, this does not necessarily mean that the doped titanium dioxide is rutile but can be material which is iso-structural with rutile.

In the present invention, the rutile crystal form may be used because of its higher refractive index. For example, the doped titanium dioxide may be 50% or more by weight rutile, such as 60% or more, e.g. 70% or more, for example, 80% or more, for example, 90% or more, for example, 95% or more, such as 99% or more, for example 99.5% or more.

The doped titanium dioxide may, for example, be doped with dopants such as calcium, magnesium, sodium, aluminium, antimony, phosphorus, and caesium.

The doped titanium dioxide may include impurities, e.g., up to a level of 10 wt % or less, such as 8 wt % or less, e.g. 5 wt % or less. These impurities result from incomplete purification and may, for example, be iron, silica, niobia or other impurities typically present in titanium dioxide bearing feedstocks.

The titanium oxide may have a lattice that is doped with an impurity which acts as a recombination center for holes and electrons. For example, Cr, Mn and V can all be used as dopants to promote recombination. These impurities tend to be added in the form of a salt before calcination, by addition of the salt to the precipitated slurry/pulp. The impurities can alternatively be allowed to come through from the titanium ore, in controlled quantities. The amounts of dopant used are typically from 2 to 10 ppm because the durability benefit has to be balanced against color deterioration.

As discussed above, the coating includes a first layer in the present invention. This is one or more material selected from inorganic oxides and phosphates. There may be only inorganic oxide material, or there may be only inorganic phosphate material, or there may be a combination of both inorganic oxide material and inorganic phosphate material.

The (or each) inorganic oxide is independently selected from an oxide of:
  (a) group 4 (IVB) and 12 (IIB) transition metals selected from Ti, Zr and Zn; and
  (b) group 13 to 15 (IIIA-VA) p-block elements selected from Si, P and Sn; and
  (c) lanthanides.
  Examples of suitable lanthanides include Ce.

As the skilled person would appreciate, the oxide material may be in the form of a mixed oxide, such as an oxyhydroxide, or in the form of a hydrated oxide, as well as in the form of an oxide containing only the element plus oxygen.

The coating agents suitable for use thus include inorganic oxides and hydrous oxides. These materials are commonly used to coat an inorganic oxide or hydrous oxide onto the surface of particles. Typical inorganic oxides and hydrous oxides that may be mentioned for use as the coating agent for the first layer include one or more oxides and/or hydrous oxides of silicon, titanium, zirconium, zinc, cerium, phosphorus, or tin.

The (or each) inorganic phosphate is independently selected from a phosphate of:
  (i) group 1 (IA) and 2 (IIA) alkali and alkaline earth metals selected from H, Li, Na, K, Rb, Be, Mg, Ca and Sr; and
  (ii) group 3 (IIIA) and 4 (IVB) transition metals selected from Sc, Y, Ti and Zr; and
  (iii) group 13 to 15 (IIIA-VA) p-block elements selected from Al, Ga, In, Tl, Ge, Sn and Pb.

The coating agents suitable for use thus include inorganic phosphates. Suitably these are colorless phosphates. Typical colorless inorganic phosphates that may be mentioned for use as the coating agent for the first layer include one or more phosphates of aluminum, titanium, zirconium, or tin. For example, the inorganic phosphate may be aluminum phosphate and/or zirconium phosphate.

In an embodiment, the first layer comprises one or more inorganic oxide independently selected from an oxide of Ti, Zr, Zn, Si, P, Sn and Ce. For example, the material for the first layer may be one or more inorganic oxide independently selected from an oxide of Zr, Si, P, and Ce.

In an embodiment, the first layer comprises one or more inorganic phosphate independently selected from a phosphate of Al, Ti, Zr, and Sn.

In an embodiment, the first layer comprises (1) one or more inorganic oxide independently selected from an oxide of Ti, Zr, Zn, Si, P, Sn and Ce and/or (2) one or more inorganic phosphate independently selected from a phosphate of Al, Ti, Zr, and Sn.

It may suitably be that the material for the first layer is one or more inorganic oxide independently selected from $SiO_2$, $ZrO_2$, $CeO_2$, and $P_2O_5$ and/or one or more inorganic phosphate independently selected from $AlPO_4$ and $ZrPO_4$.

It will be appreciated that in some embodiments the material for the first layer is only one inorganic oxide. For example, it may be just $SiO_2$, or just $ZrO_2$, or just $CeO_2$, or just $P_2O_5$.

In an embodiment, the material for the first layer is two inorganic oxides. For example, it may be $SiO_2$ with $ZrO_2$, or it may be $SiO_2$ with $CeO_2$ or it may be $SiO_2$ with $P_2O_5$ or it may be $ZrO_2$ with $CeO_2$ or it may be $ZrO_2$ with $P_2O_5$ or it may be $CeO_2$ with $P_2O_5$.

In an embodiment, the material for the first layer is only one inorganic phosphate. For example, it may be just $AlPO_4$ (which, as the skilled person will appreciate, is isostructural with silica and can form a useful dense coating) or it may be just $ZrPO_4$.

In an embodiment, the material for the first layer is two inorganic phosphates, or one inorganic oxide and one inorganic phosphate.

In an embodiment, the material for the first layer comprises silica, e.g., 50% w/w or more of the material for the first layer may be silica. In an embodiment, the material for the first layer consists essentially of silica. In an embodiment, the material for the first layer is silica.

The coating of the first layer may be dense or non dense. For example, a dense or non dense silica coating may be used and/or a dense or non dense aluminum phosphate coating may be mentioned.

The coating agent used to apply the first layer may, for example, be $SiO_2$, $ZrO_2$, $CeO_2$, $P_2O_5$, sodium silicate, potassium silicate, or mixtures thereof. Silicic acid may also be mentioned.

In an embodiment, the coating agent used to apply the first layer comprises silicon dioxide applied in a dense form. In one such embodiment, the coating comprises a dense silica coating of the type as described in U.S. Pat. No. 2,885,366.

A dense silica coating may be applied by following a recipe along the following lines:

| gpl $TiO_2$ | Temp ° C. |
|---|---|
| 350 | 90 |

| Instruction | Reagent | Addition Time (minutes) | Mixing Time minutes |
|---|---|---|---|
| ADD x % $SiO_2$ | $Na_2SiO_3$ | 45 | 30 |
| ADD $H_2SO_4$ to pH 7.5 | $H_2SO_4$ | 60 | 30 |

A dense aluminum phosphate coating may be made by adding sodium aluminate to phosphoric acid (or vice versa). Irrespective of the sequence of addition, the alumina is the counterion to the phosphate.

In the embodiment where two or more coating materials are used for the first layer, these coating materials may be applied either simultaneously in a single operation or in succession. If applied simultaneously, different coating materials may be used in combination to produce a single coating which forms the first layer. If applied successively, different coating materials may be used separately to produce two or more coatings which form the first layer, each coating having a different composition.

For example, in an embodiment, the particles are coated with silica, such as dense silica, to produce a coating, and also with zirconia to produce another coating.

In another embodiment, the particles are coated with $P_2O_5$, to produce a coating, and optionally are also coated with $CeO_2$ to produce a $CeO_2$ coating.

Surface treatments of inorganic particles with oxide materials are well known in the art. Any suitable technique can therefore be used in the step of coating the oxide coating onto the particles.

Surface treatments of inorganic particles with phosphate materials are likewise well known in the art. Any suitable technique can therefore be used in the step of coating the phosphate coating onto the particles. For example, a phosphate coating may be precipitated from phosphoric acid (by adding a basic reagent), or from alkali metal phosphate (by adding an acidic reagent).

In an embodiment of the present invention, the amount of the first layer on the particulate inorganic material is 0.1 to 2.2% w/w, when considering the total weight of the first layer material with respect to the total weight of the particulate inorganic material. Surprisingly, within this range the effects are improved as compared to when higher or lower amounts of coating are utilized.

It would not have been predicted that the selection of an amount of coating within a specific narrow range would give rise to the best results, especially when this involves utilizing less effect coating material, rather than more. The present invention has identified that the best results are obtained within a narrow range of addition levels of coating.

It may be that the amount of the first layer on the particulate inorganic material is from 0.1 to 2.1% w/w, when considering the total weight of the first layer material with respect to the total weight of the particulate inorganic material; such as from 0.1 to 2% w/w, or from 0.1 to 1.9% w/w, or from 0.1 to 1.8% w/w, or from 0.1 to 1.7% w/w, or from 0.1 to 1.6% w/w. It can, for example, be from 0.1 to 1.5% w/w.

It may be that the amount of the first layer on the particulate inorganic material is from 0.2 to 2.1% w/w, when considering the total weight of the first layer material with respect to the total weight of the particulate inorganic material; such as from 0.2 to 2% w/w, or from 0.2 to 1.9% w/w, or from 0.2 to 1.8% w/w, or from 0.2 to 1.7% w/w, or from 0.2 to 1.6% w/w. It can, for example, be from 0.2 to 1.5% w/w.

Particularly good results have been achieved when the amount of the first layer material with respect to the total weight of the particulate inorganic material is up to 1.5% w/w; such as up to 1.4% w/w, or up to 1.3% w/w, especially up to 1.2% w/w, and more especially up to 1.1% w/w, such as up to 1.0% w/w.

Particularly good results have been achieved when the amount of the first layer material with respect to the total weight of the particulate inorganic material is 0.2% w/w or more; such as 0.3% w/w or more, especially 0.4% w/w or more, and more especially 0.5% w/w or more, such as 0.6% w/w or more.

In an embodiment, it may be that the amount of the first layer on the particulate inorganic material can, for example, be from 0.2 to 1.5% w/w, when considering the total weight of the first layer material with respect to the total weight of the particulate inorganic material; such as from 0.2 to 1.4% w/w, or from 0.2 to 1.3% w/w, or from 0.2 to 1.2% w/w, or from 0.2 to 1.1% w/w.

In an embodiment, it may be that the amount of the first layer on the particulate inorganic material can, for example, be from 0.3 to 1.5% w/w, when considering the total weight of the first layer material with respect to the total weight of the particulate inorganic material; such as from 0.3 to 1.4% w/w, or from 0.3 to 1.3% w/w, or from 0.3 to 1.2% w/w, or from 0.3 to 1.1% w/w.

In an embodiment, it may be that the amount of the first layer on the particulate inorganic material can, for example, be from 0.4 to 1.5% w/w, when considering the total weight of the first layer material with respect to the total weight of the particulate inorganic material; such as from 0.4 to 1.4% w/w, or from 0.4 to 1.3% w/w, or from 0.4 to 1.2% w/w, or from 0.4 to 1.1% w/w.

In an embodiment, it may be that the amount of the first layer on the particulate inorganic material can, for example, be from 0.5 to 1.5% w/w, when considering the total weight of the first layer material with respect to the total weight of the particulate inorganic material; such as from 0.5 to 1.4% w/w, or from 0.5 to 1.3% w/w, or from 0.5 to 1.2% w/w, or from 0.5 to 1.1% w/w or from 0.5 to 1.0% w/w.

In an embodiment, it may be that the amount of the first layer on the particulate inorganic material can, for example, be from 0.6 to 1.5% w/w, when considering the total weight of the first layer material with respect to the total weight of the particulate inorganic material; such as from 0.6 to 1.4% w/w, or from 0.6 to 1.3% w/w, or from 0.6 to 1.2% w/w, or from 0.6 to 1.1% w/w or from 0.6 to 1.0% w/w.

In an embodiment it may be that the amount of the first layer on the particulate inorganic material can, for example, be from 0.7 to 1.5% w/w, when considering the total weight of the first layer material with respect to the total weight of the particulate inorganic material; such as from 0.7 to 1.4% w/w, or from 0.7 to 1.3% w/w, or from 0.7 to 1.2% w/w, or from 0.7 to 1.1% w/w or from 0.7 to 1.0% w/w.

When reference is made herein to the addition level of coating on the titanium dioxide particles, this is given as a w/w amount, i.e., the total weight amount of coating material that is added with respect to the total weight amount of titanium dioxide particles treated. Thus, for example, when considering a silica coating, it may be stated that "the addition level of the $SiO_2$ was 1.5% w/w on to the $TiO_2$".

The coating material may be used to treat the titanium dioxide particles in the provided dispersion by adding the coating material to the dispersion or by adding the dispersion to the coating material. Mixing of the coating material and dispersion can, for example, be carried out using conventional mixing equipment as known in the art.

Mixing may be carried out for any suitable length of time, e.g., 1 minute or more, 2 minutes or more, 3 minutes or more, 4 minutes or more, or 5 minutes or more. It may be that mixing is carried out for no more than 3 hours, e.g., no more than 2 hours, such as 1 hour or less. In an embodiment, the mixing can, for example, be carried out for from 5 minutes to 1 hour, such as from 10 minutes to 45 minutes, e.g. from 20 minutes to 40 minutes.

It is to be noted that the coating does not immediately react when added. Instead, as the skilled person will appreciate, the coating reacts/precipitates in response to a subsequent pH change. For example, in the case of silica, the application of an integral dense coating is dependent on the rate of pH change once the reagents are in the tank. This rate of pH change is typically from minus 1 to minus 2 units per hour, e.g., about minus 1.5 units in 1 hour.

In an embodiment, a coating may be applied as follows: an aqueous dispersion comprising particles of titanium dioxide is introduced into a tank for stirring. The temperature of the dispersion is then adjusted (e.g., to 75 to 90° C.) and its pH is adjusted (e.g., to about 10.5). A coating material is then introduced into the stirred tank in an amount sufficient to produce the desired coating. For example, to produce a 1% by weight dense silica coating, 1% silica (% wt/wt on titanium dioxide) is added to the stirred tank over a 30 minute period and is then mixed for 30 minutes; whilst to produce a 3% by weight dense silica coating, 3% silica (% wt/wt on titanium dioxide) is added in the same manner. In an embodiment, silica may be added to the stirred tank in the form of sodium silicate as coating material. To precipitate the dense silica coating onto the particles, the pH is adjusted, e.g., by adding sulfuric acid to the stirred tank. In an embodiment, sulfuric acid is added over a 60 minute period to bring the pH to about 8.

The skilled reader will of course appreciate that this method can readily be modified to add different amounts of coating, as desired and within the ranges of the present invention. The coating of inorganic particulate material, such as titania, can readily be put into practice by the skilled person.

The first layer can, for example, be applied directly to the particulate material surface.

As noted above, the material for the second layer is alumina. The coating of the particles with this second layer can be carried out by coating techniques as discussed above for the first layer.

For example, the coating agent may be $Al_2O_3$, sodium aluminate, aluminum chloride, aluminum sulfate, or mixtures thereof.

The alumina coating may be dense or non dense.

In an embodiment, the first layer can, for example, comprise dense silica coating and the second layer can, for example, comprise dense alumina coating.

In an embodiment, the first layer can, for example, comprise dense aluminum phosphate coating and the second layer can, for example, comprise dense alumina coating.

As the skilled person would appreciate, if the first layer comprises aluminum phosphate, then when making such an aluminum phosphate coating (e.g., by adding sodium aluminate to phosphoric acid, or vice versa) it is possible to provide that there is a stoichiometric excess of alumina. In that case, some alumina will thus be present as the counterion to the phosphate, but some alumina will provide the required second layer that is an alumina layer. In such embodiments, it is thus not necessary to have a separate application step where a layer of alumina is applied to the particles. Instead, the formation of the first layer and the formation of the second layer can occur in a single stage.

As the skilled person would appreciate, in such a situation, the layers may be indistinct and will not be separate. However, there would be a concentration gradient with more alumina towards the exterior of the product (the outer surface of the coating) and with more aluminum phosphate towards the surface of the particles. The desired properties will therefore result.

The amount of the second layer on the particulate inorganic material may be from 0.1 to 3.5% w/w when considering the total weight of the second layer material with respect to the total weight of the particulate inorganic material.

It may be that the amount of the second layer on the particulate inorganic material is from 0.2 to 3.5% w/w when considering the total weight of the second layer material with respect to the total weight of the particulate inorganic material; for example, it may be from 0.3 to 3.5% or from 0.4 to 3.5 w/w. It may be from 0.2 to 3.4% w/w, or from 0.3 to 3.4% or from 0.4 to 3.4 w/w.

In an embodiment, it may be that the amount of the second layer on the particulate inorganic material is from 0.3 to 3.2% w/w when considering the total weight of the second layer material with respect to the total weight of the particulate inorganic material; for example, it may be from 0.4 to 3.2% or from 0.5 to 3.2%. It may be from 0.4 to 3.1%, or from 0.5 to 3.1%, or from 0.6 to 3.1%.

In an embodiment, it may be that the amount of the second layer on the particulate inorganic material is from 0.4 to 3% w/w when considering the total weight of the second layer material with respect to the total weight of the particulate inorganic material; for example, it may be from 0.5 to 3% or from 0.6 to 3%.

In an embodiment, it may be that the amount of the second layer on the particulate inorganic material is from 0.2 to 2.8% w/w when considering the total weight of the second layer material with respect to the total weight of the particulate inorganic material; for example, it may be from 0.3 to 2.7% or from 0.4 to 2.6%; for example from 0.5 to 2.5% w/w. It may be from 0.6 to 2.5%.

The second layer is, in an embodiment, present in an amount of from 0.7 to 3.5% w/w when considering the total weight of the second layer material with respect to the total weight of the particulate inorganic material; for example, it may be from 0.8 to 3.5% or from 0.9 to 3.5 w/w or from 1 to 3.5 w/w. It may be from 0.7 to 3.4% w/w, or from 0.8 to 3.4% or from 0.9 to 3.4 w/w or from 1 to 3.4 w/w.

In an embodiment, it may be that the amount of the second layer on the particulate inorganic material is from 0.7 to 3.2% w/w when considering the total weight of the second layer material with respect to the total weight of the particulate inorganic material; for example, it may be from 0.8 to 3.2% or from 0.9 to 3.2% or from 1 to 3.2 w/w. It may be from 0.7 to 3.1%, or from 0.8 to 3.1%, or from 0.9 to 3.1% or from 1 to 3.1 w/w.

In an embodiment, it may be that the amount of the second layer on the particulate inorganic material is from 0.7 to 3% w/w when considering the total weight of the second layer material with respect to the total weight of the particulate inorganic material; for example, it may be from 0.8 to 3% or from 0.9 to 3% or from 1 to 3 w/w.

In an embodiment, it may be that the amount of the second layer on the particulate inorganic material is from 0.7 to 2.8% w/w when considering the total weight of the second layer material with respect to the total weight of the particulate inorganic material; for example, it may be from 0.7 to 2.7% or from 0.8 to 2.6%; for example, from 0.9 to 2.5% w/w. It may be from 1 to 2.5%.

In an embodiment, it may be that the amount of the second layer on the particulate inorganic material is from 0.7 to 2.5%, or from 0.8 to 2.5%, or from 0.9 to 2.5% w/w. In an embodiment, it is from 1 to 2.5% w/w. In an embodiment, it may be that the amount of the second layer on the particulate inorganic material is from 1.1 to 2.5%, or from 1.2 to 2.5%, or from 1.3 to 2.5% w/w. In an embodiment, it is from 1.4 to 2.5% w/w. It may be from 1.5 to 2.5% w/w, when considering the total weight of the second layer material with respect to the total weight of the particulate inorganic material.

The second layer is, in an embodiment, applied directly to the first layer. However, as discussed above, in some embodiments, the alumina layer may be formed without the need for a separate application step, due to a stoichiometric excess of alumina being included when forming a first layer that comprises aluminum phosphate.

In the present invention, the total amount of coating (first layer plus second layer) is from 0.2 to 4.5% w/w when considering the total weight of the first and second layer material with respect to the total weight of the particulate inorganic material. Within this range, the photocatalytic suppression effects are surprisingly improved as compared to when higher or lower amounts of total coating are utilized.

It would not have been predicted that the selection of an amount of total coating within a specific narrow range would give rise to the best results, especially when this involves utilizing less coating material, rather than more. The present invention has identified that the best results are obtained within a precise range of addition levels of coating.

In an embodiment, the total amount of coating (first layer plus second layer) is from 0.2 to 4.4% w/w, when considering the total weight of the first and second layer material with respect to the total weight of the particulate inorganic material; for example, it may be from 0.2 to 4.3%; for example, it is from 0.2 to 4.2% w/w. It may be from 0.2 to 4.1%, or from 0.2 to 4% or from 0.2 to 3.9% or from 0.2 to 3.8%.

In an embodiment, the total amount of coating (first layer plus second layer) is from 0.3 to 4.5% w/w, when considering the total weight of the first and second layer material with respect to the total weight of the particulate inorganic material; for example, it may be from 0.3 to 4.4% or from 0.3 to 4.3%; for example, it is from 0.3 to 4.2% w/w. It may be from 0.3 to 4.1%, or from 0.3 to 4% or from 0.3 to 3.9% or from 0.3 to 3.8%.

In an embodiment, the total amount of coating (first layer plus second layer) is from 0.5 to 4.5% w/w, when considering the total weight of the first and second layer material with respect to the total weight of the particulate inorganic material; for example it may be from 0.5 to 4.4% or from 0.5 to 4.3%; for example, it is from 0.5 to 4.2% w/w. It may be from 0.5 to 4.1%, or from 0.5 to 4% or from 0.5 to 3.9% or from 0.5 to 3.8%.

Particularly good results have been achieved when the total amount of coating (first layer plus second layer), when considering the total weight of the first and second layer material with respect to the total weight of the particulate inorganic material, is up to 4.1% w/w; such as up to 4% w/w or up to 3.9% w/w, or up to 3.8% w/w, and especially up to 3.7% w/w, and more especially up to 3.6% w/w, such as up to 3.5% w/w.

Particularly good results have been achieved when the total amount of coating (first layer plus second layer), when considering the total weight of the first and second layer material with respect to the total weight of the particulate inorganic material, is 0.6% w/w or more; such as 0.7% w/w or more, especially 0.8% w/w or more, and more especially 0.9% w/w or more, such as 1% w/w or more, e.g. 1.1% or more or 1.2% or more.

In an embodiment, the total amount of coating (first layer plus second layer) is from 0.7 to 4.3% w/w when considering the total weight of the first and second layer material with respect to the total weight of the particulate inorganic material; for example, it may be from 0.7 to 4.1% or from 0.7 to 4% or from 0.7 to 3.9% or from 0.7 to 3.8%; preferably it is from 0.7 to 3.7% w/w. It may be from 0.8 to 4.2% or from 0.8 to 4.1% or from 0.8 to 4% or from 0.8 to 3.9%. It may be from 0.7 to 3.6%, or from 0.7 to 3.5%.

In an embodiment, the total amount of coating (first layer plus second layer) is from 1 to 4.5% w/w when considering the total weight of the first and second layer material with respect to the total weight of the particulate inorganic material; for example, it may be from 1 to 4.4% or from 1 to 4.3%; for example, it is from 1 to 4.2% w/w. It may be from 1 to 4.1%, or from 1 to 4%. It may be, for example, from 1 to 3.9% or from 1 to 3.8%; for example, it is from 1 to 3.7% w/w. It may be from 1 to 3.6%, or from 1 to 3.5%. It may be from 1.2 to 4.2%, or from 1.2 to 4.1%, or from 1.2 to 4%, or from 1.2 to 3.9%.

In an embodiment, the total amount of coating (first layer plus second layer) is from 1.5 to 4.5% w/w when considering the total weight of the first and second layer material with respect to the total weight of the particulate inorganic material; for example, it may be from 1.5 to 4.4% or from 1.5 to 4.3%; for example, it is from 1.5 to 4.2% w/w. It may be from 1.5 to 4.1%, or from 1.5 to 4%. It may be, for example, from 1.5 to 3.9% or from 1.5 to 3.8%; for example, it is from 1.5 to 3.7% w/w. It may be from 1.5 to 3.6%, or from 1.5 to 3.5%, or from 1.5 to 3.4%, or from 1.5 to 3.3%.

Particularly good results have been achieved when the total amount of coating (first layer plus second layer), when considering the total weight of the first and second layer material with respect to the total weight of the particulate inorganic material is from 1.8 to 4.5% w/w when considering the total weight of the first and second layer material with respect to the total weight of the particulate inorganic material; for example, it may be from 1.8 to 4.2% or from 1.8 to 4.1%. It may be from 1.8 to 3.8%, or from 1.8 to 3.6%, or from 1.8 to 3.4%, or from 1.8 to 3.2%.

In an embodiment, the total amount of coating (first layer plus second layer) is from 1.9 to 4.5% w/w when considering the total weight of the first and second layer material with respect to the total weight of the particulate inorganic material; for example, it may be from 1.9 to 4.4% or from 1.9 to 4.3%; for example, it is from 1.9 to 4.2% w/w. It may be from 1.9 to 4.1%, or from 1.9 to 4%. It may be, for example, from 1.9 to 3.9% or from 1.9 to 3.8%; for example, it is from 1.9 to 3.7% w/w. It may be from 1.9 to 3.6%, or from 1.9 to 3.5%.

In an embodiment the total amount of coating (first layer plus second layer) is from 2 to 4.5% w/w when considering the total weight of the first and second layer material with respect to the total weight of the particulate inorganic material; for example, it may be from 2 to 4.4% or from 2 to 4.3%; for example, it is from 2 to 4.2% w/w. It may be from 2 to 4.1%, or from 2 to 4%. It may be, for example, from 2 to 3.9% or from 2 to 3.8%; preferably it is from 2 to 3.7% w/w. It may be from 2 to 3.6%, or from 2 to 3.5%.

In an embodiment, the total amount of coating (first layer plus second layer) is from 2.1 to 4.5% w/w when considering the total weight of the first and second layer material with respect to the total weight of the particulate inorganic material; for example, it may be from 2.1 to 4.4% or from 2.1 to 4.3%; for example, it is from 2.1 to 4.2% w/w. It may be from 2.1 to 4.1%, or from 2.1 to 4%. It may be, for example, from 2.1 to 3.9% or from 2.1 to 3.8%; for example, it is from 2.1 to 3.7% w/w. It may be from 2.1 to 3.6%, or from 2.1 to 3.5%.

In an embodiment, the particles are further treated with coagulant or a dispersive agent. This is suitably carried out after the coating steps. The particulate inorganic material may be subjected to a further inorganic treatment and/or organic surface treatment. An organic surface treatment, such as with polyol, amine (e.g., an alkanolamine) or silicone derivatives, may be used. This may, in particular, improve dispersability. Typical organic compounds used are trimethylolpropane, pentaerythritol, triethanolamine, n-octyl phosphonic acid and trimethylolethane.

When preparing a coated material according to the present invention, particulate inorganic material, e.g., titanium dioxide, is used as a starting material.

As the skilled person will appreciate, the particulate inorganic material, e.g., titanium dioxide, is prepared via a process that involves a milling step. A milling step can, for example, involve the use of a mill selected from fine media mills and sand mills. In such mills fine grinding media, accelerated by means other than gravity, may be used to reduce slurried pigment agglomerates to sub micrometer size.

Particles resulting from the milling step are then coated with the first layer and second layer according to the present invention.

The coating of the particulate inorganic material, e.g., titanium dioxide, may be similar to that of conventional pigmentary material, as known in the art. It may therefore involve dispersion of the material in water, following which suitable coating reagents, such as aluminum sulfate, are added. The pH is then adjusted to cause precipitation of the desired hydrated oxide to form a coating onto the surface of the material.

In an embodiment, the coating may involve the addition of suitable coating reagents, such as sodium silicate to form a silica coating layer and aluminum sulfate to form an alumina coating layer, to an aqueous slurry of the material to be coated; the pH of the aqueous slurry is then adjusted to cause precipitation of the desired hydrated oxide to form a coating on the surface of the titanium dioxide, doped titanium dioxide, or combinations thereof.

Coatings may generally be achieved by addition of suitable salts to the particulate materials at either an acidic pH (e.g., pH from around 1 to 2) or a basic pH (e.g., pH from around 9.5 to 12), with neutralization to effect precipitation. The salts may firstly be added followed by subsequently adjustment of the pH: alternatively the pH may be adjusted whilst the salt is being added.

After coating formation, the coated material may be washed and dried before being ground, e.g., in a fluid energy mill or microniser, to separate particles that have been stuck together by the coating and/or drying steps.

At this final milling stage, organic surface treatments, e.g., with polyol, amine, alkyl phosphonic acid or silicone derivatives, may be applied as required.

In an embodiment, the particulate material may be treated to selectively remove particular size fractions. For example, any particles which are 5 µm in diameter or greater may be removed; in an embodiment, any particles which are 3 µm in diameter or greater may be removed. Such particles may be removed by, for example, a centrifugation treatment.

The coated particulate inorganic material described herein has beneficial optical properties, in the near infrared and reduced photocatalytic activity, providing improved durability when compared to those materials coated with high amounts of an oxide material (e.g., those coated at conventional levels with 3% or more by weight of photocatalytic coating, such as silica, plus 2 or 3% of alumina coating for durability). These properties make it suitable for applications and products that are exposed to the sun during use.

For example, solar exposed surfaces containing coated titanium dioxide particles according to the present invention have better retention of gloss, color and surface integrity. The present invention also allows opacity to be provided to surfaces where photocatalytic activity would render existing titanium dioxide products unsuitable (e.g., fluoropolymer surfaces).

The present invention therefore further provides a product comprising the coated particulate inorganic material.

The product suitably comprises the coated particulate inorganic material together with a carrier. The carrier may be a resin or a binder or the like. In an embodiment, the product is a paint and comprises the coated particulate inorganic material together with a resin.

In an embodiment, the product is exposed to the sun during use. Such product may comprise the coated particulate material in an amount of from 0.5 to 70 vol %, such as from 1 to 60 vol %, e.g. from 2 to 50 vol %.

The level of coated particulate material in the application may be selected appropriately, depending on the intended application.

The product that is exposed to the sun during use may be selected from plastics products (e.g., plastic containers), inks, coating compositions (including paints and powder coating compositions), roofing compositions (for example, it may be a shingle, tile, or granular coating) or ground covering compositions (such as a road surface product, flooring product, driveway surface product, car park surface product or pavement surface product), and solar reflective products.

In an embodiment, the product is a paint, and it may comprise the coated particulate material in an amount of from 5 to 50% v/v, such as from 10 to 30% v/v, e.g. from 15 to 20% v/v.

In an embodiment, the product is a plastics product, and it may comprise the coated particulate material in an amount of from 0.5 to 70% v/v; for example, in masterbatches levels of the coated particulate material as high as from 50 to 70% v/v may be possible or desirable, whilst in polythene bags levels of the coated particulate material as low as from 1 to 3% v/v may be desirable.

In an embodiment, the product is a coating composition for a roofing product or ground covering product and it may comprise the coated particulate material in an amount of from 1 to 50% v/v.

In an embodiment, the product is a paint and comprises the coated particulate inorganic material together with a resin.

It is beneficial to use a resin with an attenuation coefficient at 300 nm of below 0.02/micron, e.g., from 0.00001 to 0.02/micron, such as from 0.0001 to 0.02/micron. Attenuation coefficients can be calculated using the Beer Lambert equation, as discussed above.

This attenuation coefficient value represents the proportion of radiation attenuated by each micron of film thickness. The higher the value, the poorer the transmission.

In the present invention, it has been determined that the best results are obtained for paint products that use coated large crystal $TiO_2$ wherein the levels of coating are low (as discussed above) and wherein the resin has low transmission. It was not previously recognized that by selecting large crystal $TiO_2$, then selecting to coat this with effect coating but at a lower level than conventionally used, and then selecting to use this in a paint system where the resin has a low transmission, surprisingly good results would be seen. Such a product has surprisingly lowered photocatalytic activity.

The present invention thus provides particular significant benefits when the coated products are used with resins having attenuation coefficient at 300 nm of below 0.02/micron. This leads to particularly and surprisingly durable products.

In an embodiment, the resin has an attenuation coefficient at 300 nm of below 0.02/micron, e.g., from 0.00001 to 0.02/micron, such as from 0.0001 to 0.02/micron Beneficial results are in particular seen when using a resin with an attenuation coefficient at 300 nm of below 0.015/micron, e.g., from 0.00001 to 0.015/micron, such as from 0.0001 to 0.015/micron or from 0.0005 to 0.015/micron.

In an embodiment, the resin used is one with an attenuation coefficient at 300 nm of below 0.012/micron, e.g., from 0.00001 to 0.012/micron, such as from 0.0001 to 0.012/micron or from 0.0005 to 0.012/micron.

In an embodiment, the resin used is one with an attenuation coefficient at 300 nm of below 0.011/micron, e.g., from 0.00001 to 0.011/micron, such as from 0.0001 to 0.011/micron or from 0.0005 to 0.011/micron.

In an embodiment, the resin used is one with an attenuation coefficient at 300 nm of below 0.01/micron, e.g., from 0.00001 to 0.01/micron, such as from 0.0001 to 0.01/micron or from 0.0005 to 0.01/micron.

Examples of suitable resins include polyester melamine formaldehyde, PVDF acrylic and acrylic melamine formaldehyde.

The present invention will now be further described via the following non-limiting examples.

EXAMPLES

Example 1

1.1a Preparation of the Particulate Inorganic Material $TiO_2$ particles with an average crystal size of 1 micron were prepared as follows:

a) Production of Starting Material Using Blumenfeld Precipitation

A titaniferous feedstock was digested with concentrated sulfuric acid and the cake obtained dissolved in a more dilute sulfuric acid solution to produce a solution of a titanium sulfate. This titanium sulfate solution was subsequently heated to precipitate hydrous titanium oxide after addition of 0.03% Blumenfeld rutile nuclei. This hydrous titanium oxide pulp was used as the starting material.

b) Formation of Large Crystal $TiO_2$ from Starting Material

The pulp was filtered and washed. Potassium and aluminum sulfate solutions were then added to the pulp to give 0.2% $K_2O$ and 0.08% $Al_2O_3$ (expressed as % wt/wt on $TiO_2$). The pulp was then dried and calcined in a rotary kiln. During the calcinations, the temperature was increased at a rate of 1° C./min to 1030° C. The sample was then held at 1030° C. for 30 minutes before being allowed to cool.

c) Characterization

The resultant $TiO_2$ was characterized by i) obtaining an electron micrograph of a rubbed out sample and subsequently analyzing the image using a KS300 Image Analyser by Carl Zeiss to obtain the mass average crystal size; and ii) measuring the X-ray diffraction pattern to obtain the % rutile.

d) Results

The obtained $TiO_2$ had a mass average crystal size of about 1 µm, and a % rutile of >95%.

The Geometric Weight Standard Deviation, as measured by Brookhaven X-ray disk centrifuge, showed that 30% or more of the particles were less than 1 micron in size. There was a typical log normal distribution of about 1.3.

1.1b Comparative Particulate Inorganic Material

In addition, a "superdurable" commercial product was obtained. This product had a crystal size of 0.25 microns and had a 3 w/w % silica coating and a 2 w/w % alumina coating.

1.2 Preparation of the Coated Particulate Inorganic Material

An aqueous dispersion of the $TiO_2$ particles as made in section 1.1 was prepared and milled. In this regard, the particles were firstly dry milled using a Raymond mill and then slurried to form an aqueous dispersion with a concentration of 350 g/l. The dispersion was then wet milled for 30 minutes in a fine media mill containing Ottawa sand. The sand was then separated from the dispersion.

The resulting dispersion was divided into portions, each of which was treated so as to coat the particles with silica. The coating levels used were 1%, 2% and 3% w/w, when considering the total weight of the silica material with respect to the total weight of the particulate titania. In each case a dense silica coating was applied.

To achieve the silica coating, the $TiO_2$ slurry was introduced into a stirred tank and the pH was adjusted to 10.5. The relevant weight amount of silica was added as sodium silicate over 30 minutes and was then mixed for 30 minutes. Sulfuric acid was added, over 60 minutes, to bring the pH down to 8.8 and then over a further period of 35 minutes to bring the pH to 1.3, thus precipitating the coating onto the particles.

Each sample was then also provided with an alumina coating. The coating levels used in each case was 2% w/w, when considering the total weight of the alumina material with respect to the total weight of the particulate titania.

The alumina coating was achieved by adding caustic sodium aluminate over 25 minutes to bring the pH to 10.25, whereupon it was mixed for 20 minutes. Then the pH was adjusted to 6.5, by the addition of sulphuric acid.

These dispersions of coated titania were then each filtered, washed, dried and micronized in a fluid energy mill to yield three batches of product. Each product was a white pigment in powder form.

1.3 Production of Paint

The three batches of coated titania (3 w/w % silica coating and 2 w/w % alumina coating; 2 w/w % silica coating and 2 w/w % alumina coating; 1 w/w % silica coating and 2 w/w % alumina coating) were then each incorporated in three different paints.

The paint systems used were:
(i) an alkyd melamine formaldehyde based paint;
(ii) a polyester melamine formaldehyde based paint; and
(iii) a PVDF acrylic based paint (17% pvc, PVDF Kynar 500-acrylic).

The paints were made using the method of Appendix 1 below. The level of particulate titania used was the same within each paint system.

Two samples of coated titania with 3 w/w % silica coating and 2 w/w % alumina coating were tested in the PVDF acrylic based paint.

In addition, the "superdurable" commercial product described in 1.1b was tested by likewise being incorporated into these paint types. This product had a crystal size of 0.25 microns and had a 3 w/w % silica coating and a 2 w/w % alumina coating.

1.4 Durability

Durability was measured using an Atlas Ci65a Weatherometer. The testing was carried out in accordance with Appendix 2 below.

Results

FIG. 1 shows the mass-loss over time for the four samples when tested in the PVDF acrylic based paint.

When considering the 3% dense silica coated materials, the product that used the large crystal size (average crystal size of 1 micron) for the titanium dioxide had a lower weight loss than the commercial product, which had a conventional crystal size (conventional visible spectrum optimized) for the titanium dioxide. There is thus a technical benefit to the crystal size required by the claimed invention.

When considering the effect of lowering the coating level, over the course of the test the mass-losses were clearly lower for the 2 w/w % coated product as compared to the 3 w/w % coated products.

Likewise, over the course of the test the mass-losses were clearly lower for the 1 w/w % coated product as compared to the 2 w/w % coated product.

It can therefore clearly be seen that the results for the samples having 2 w/w % and 1 w/w % silica coating were noticeably better than those samples where there was 3 w/w % coating, with the best result being for the 1 w/w % coating level. This was surprising. It would have been expected that a greater amount of coating would lead to a greater technical effect; i.e., a more significantly reduced photocatalytic effect for the particles and therefore less mass-loss.

Figure 2:
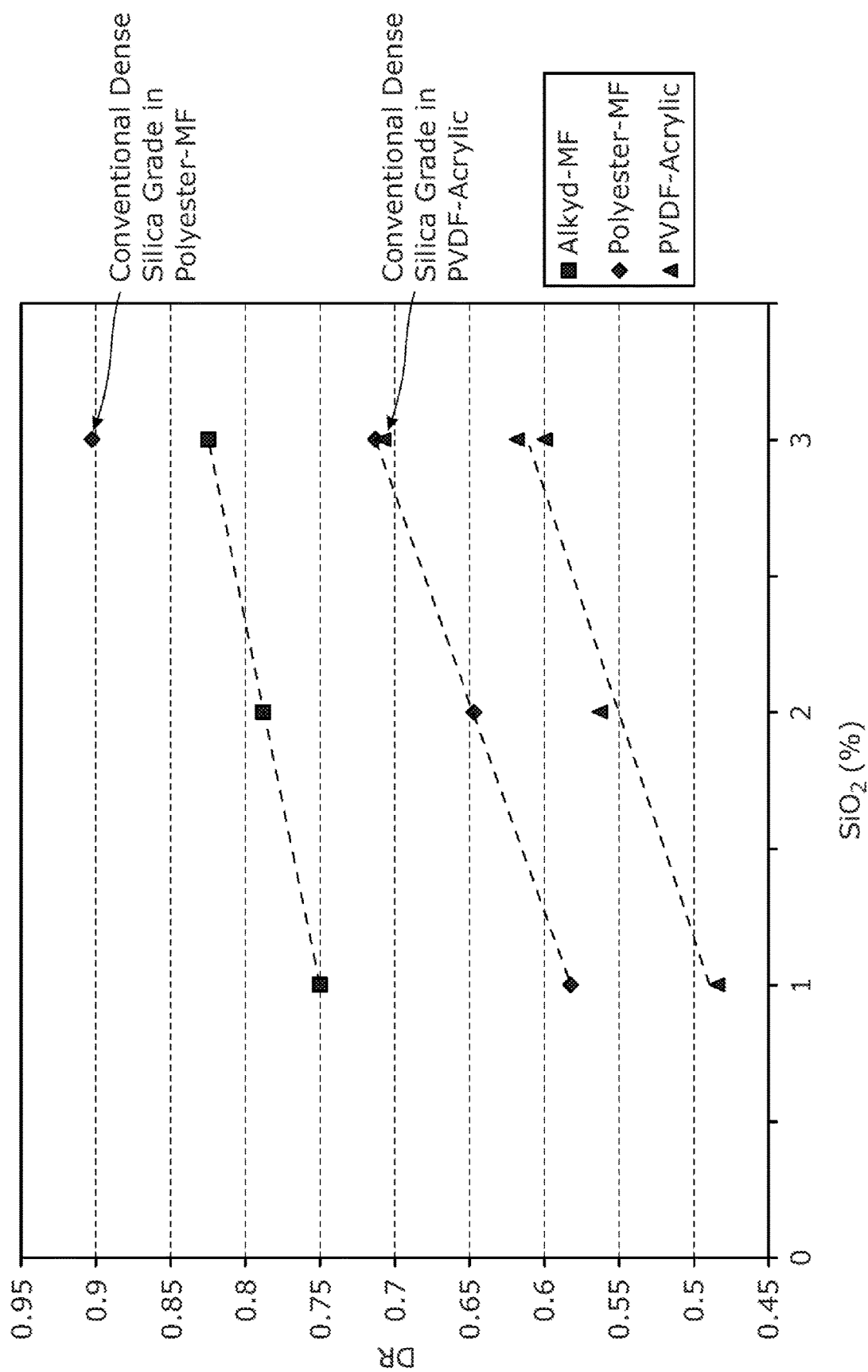
FIG. 2 is a graph showing the durability ratio for the four samples of coated titania as obtained in Example 1 in different paint bases, with the results being plotted with respect to the level of silica coating on the particles.

FIG. 2 shows the durability ratio (rate of mass-loss of the test pigment relative to that of a standard pigment) for the samples of coated titania in each of the three paint bases, with respect to the level of silica coating on the particles (1, 2 or 3 w/w %). The line of best fit is shown as a dotted line for each of the three paint bases.

The durability ratios for the commercial sample (3 w/w % coated), in both the polyester melamine formaldehyde based paint and in the PVDF acrylic based paint, are also plotted. A data point for the commercial sample was not obtained in respect of the alkyd melamine formaldehyde (the expected result would be off the y axis).

In each of the three paint systems, the lower levels of coating gave the best results. In each system the durability ratio for the 2 w/w % coated product was lower than that for the 3 w/w % coated product as well as the commercial product. In each system the durability ratio for the 1 w/w % coated product was lower than that for the 2 w/w % coated products.

Therefore, surprisingly, the application of less coating gives rise to greater durability for the large crystal size products.

It can be seen that lowering the level of silica coating had the greatest effect in the PVDF-acrylic. This system would be expected to discriminate almost entirely on a photocatalytic (as opposed to photochemical) basis.

Therefore this highlights the beneficial reduced photocatalytic effect for the large size particles (which have an average crystal size of from 0.4 µm to 2 µm) that is achieved by having coating on the particles but at a lower level than is conventional. This also highlights the advantage of utilizing the coated product in a resin that has low transmission. As shown in Appendix 3, PVDF-acrylic has an attenuation coefficient at 300 nm of 0.001/micron. It therefore has a very low transmission.

Example 2

2.1 Preparation of Coated $TiO_2$ Particles $TiO_2$ particles with an average crystal size of 1 micron were prepared in accordance with section 1.1.

2.2 Preparation of the Coated Particulate Inorganic Material

Coatings were applied to the $TiO_2$ particles with an average crystal size of 1 micron in accordance with section 1.2.

The coating levels prepared were:

| $SiO_2$ | $Al_2O_3$ |
|---|---|
| 3.0 | 2.0 |
| 2.0 | 2.0 |
| 1.0 | 2.0 |
| 2.0 | 1.2 |
| 1.0 | 0.6 |

2.3 Production of Paint

The five samples of coated titania, were then each incorporated into:

(A) a PVDF acrylic based paint (17% pvc, PVDF Kynar 500-acrylic);
(B) an alkyd melamine formaldehyde based paint; and
(C) a polyester melamine formaldehyde based paint;

as in section 1.3.

In addition, the "superdurable" commercial product described in section 1.1b was tested by likewise being incorporated into these three paint types. This product had a crystal size of 0.25 microns and had a 3 w/w % silica coating and a 2 w/w % alumina coating.

2.4 Durability

Durability was measured using an Atlas Ci65a Weather-Ometer®. The testing was carried out in accordance with Appendix 2 below. The durability ratio (rate of mass-loss of the test pigment relative to that of a standard pigment) was calculated in each case.

Results

The durability ratio (DR) values are set out in Table 1 below:

TABLE 1

| Sample No. | $SiO_2$ | $Al_2O_3$ | DR (PVDFAc) | DR (AlkydMF) | DR (PEMF) |
|---|---|---|---|---|---|
| 1 | 3.0 | 2.0 | 0.623 | No result | 0.713 |
| 2 | 3.0 | 2.0 | 0.617 | 0.825 | No result |
| 3 | 2.0 | 2.0 | 0.532 | 0.788 | 0.648 |
| 4 | 1.0 | 2.0 | 0.490 | 0.749 | 0.582 |
| 5 | 2.0 | 1.2 | 0.505 | 0.724 | 0.588 |
| 6 | 1.0 | 0.6 | 0.510 | 0.680 | 0.571 |

The durability ratio (DR) values for the "superdurable" commercial product, having a 0.25 micron average crystal size, are set out in Table 2 below:

TABLE 2

| $SiO_2$ | $Al_2O_3$ | DR (PVDFAc) | DR (AlkydMF) | DR (PEMF) |
|---|---|---|---|---|
| 3.0 | 2.0 | 0.762 | 0.813 | 0.903 |

It can therefore be seen that the products all gave better durability results than the durability standard (Calais TR92 TS45203), as shown by the DR values being below 1. As the skilled person will appreciate, a DR of 1 means that the durability is the same as the durability standard.

In addition, all of the tested large crystal titania materials coated according to the present invention showed durability ratios that are comparable with or, in almost all instances, better than the "superdurable" commercial product.

Overall, those products with lower levels of coating gave better durability. The best results across the tests were from the products that had coatings of 2% $SiO_2$ and 1.2% $Al_2O_3$, 1% $SiO_2$ and 2% $Al_2O_3$%, and 1% $SiO_2$ and 0.6% $Al_2O_3$.

Therefore, within the range of coating amounts tested, the application of less coating surprisingly gives rise to greater durability for the large crystal size products.

It can also be seen that the best results were obtained for the coated products when used in a resin with low transmission. As shown in Appendix 3, PVDF-acrylic has an attenuation coefficient at 300 nm of 0.001/micron and polyester melamine formaldehyde has an attenuation coefficient at 300 nm of 0.009/micron. In contrast, the alkyd melamine formaldehyde has an attenuation coefficient at 300 nm of 0.021/micron and it can be seen the resulting product is less durable. Thus there is a technical benefit to using the coated products in the low transmission resins.

Example 3

31 Preparation of Coated $TiO_2$ Particles $TiO_2$ particles with an average crystal size of 1 micron were prepared in accordance with section 1.1.

3.2 Preparation of the Coated Particulate Inorganic Material

An aqueous dispersion of the $TiO_2$ particles as made in section 3.1 was prepared and milled. In this regard, the particles were firstly dry milled using a Raymond mill and then slurried to form an aqueous dispersion with a concentration of 350 g/l. The dispersion was then wet milled for 30 minutes in a fine media mill containing Ottawa sand. The sand was then separated from the dispersion.

The resulting dispersion was divided into portions, each of which was treated so as to coat the particles with silica. The coating levels used were 0.3%, 0.6%, 0.9%, 1.2% and 3% w/w, when considering the total weight of the silica material with respect to the total weight of the particulate titania. In each case a dense silica coating was applied.

To achieve the silica coating, the $TiO_2$ slurry was introduced into a stirred tank and the pH was adjusted to 10.5. The relevant weight amount of silica was added as sodium silicate over 30 minutes and was then mixed for 30 minutes. Sulfuric acid was added, over 60 minutes, to bring the pH to 8.8 and then over a further period of 35 minutes to bring the pH to 1.3.

Each sample was then also provided with an alumina coating. The coating levels of alumina used in each case was 2% w/w, when considering the total weight of the alumina material with respect to the total weight of the particulate titania.

The alumina coating was achieved by adding caustic sodium aluminate over 25 minutes to bring the pH to 10.25, whereupon it was mixed for 20 minutes. Finally, the pH was adjusted to 6.5 by addition of sulfuric acid These dispersions of coated titania were then each filtered, washed, dried and micronized in a fluid energy mill to yield five batches of product. Each product was a white pigment in powder form.

3.3 Production of Paint

The five batches of coated titania were then each incorporated into an acrylic melamine formaldehyde paint.

In addition, the "superdurable" commercial product described in section 1.1b was tested by likewise being incorporated into these three paint types. This product had a crystal size of 0.25 microns and had a 3 w/w % silica coating and a 2 w/w % alumina coating.

The acrylic melamine formaldehyde paints were made using the method of Appendix 1 below. The pigment samples were incorporated at a 21% volume fraction in the acrylic melamine formaldehyde resin system.

3.4 Durability

Durability was measured using an Atlas Ci500a Weather-Ometer®. The testing was carried out in accordance with Appendix 2 below.

Results

Figure 3:
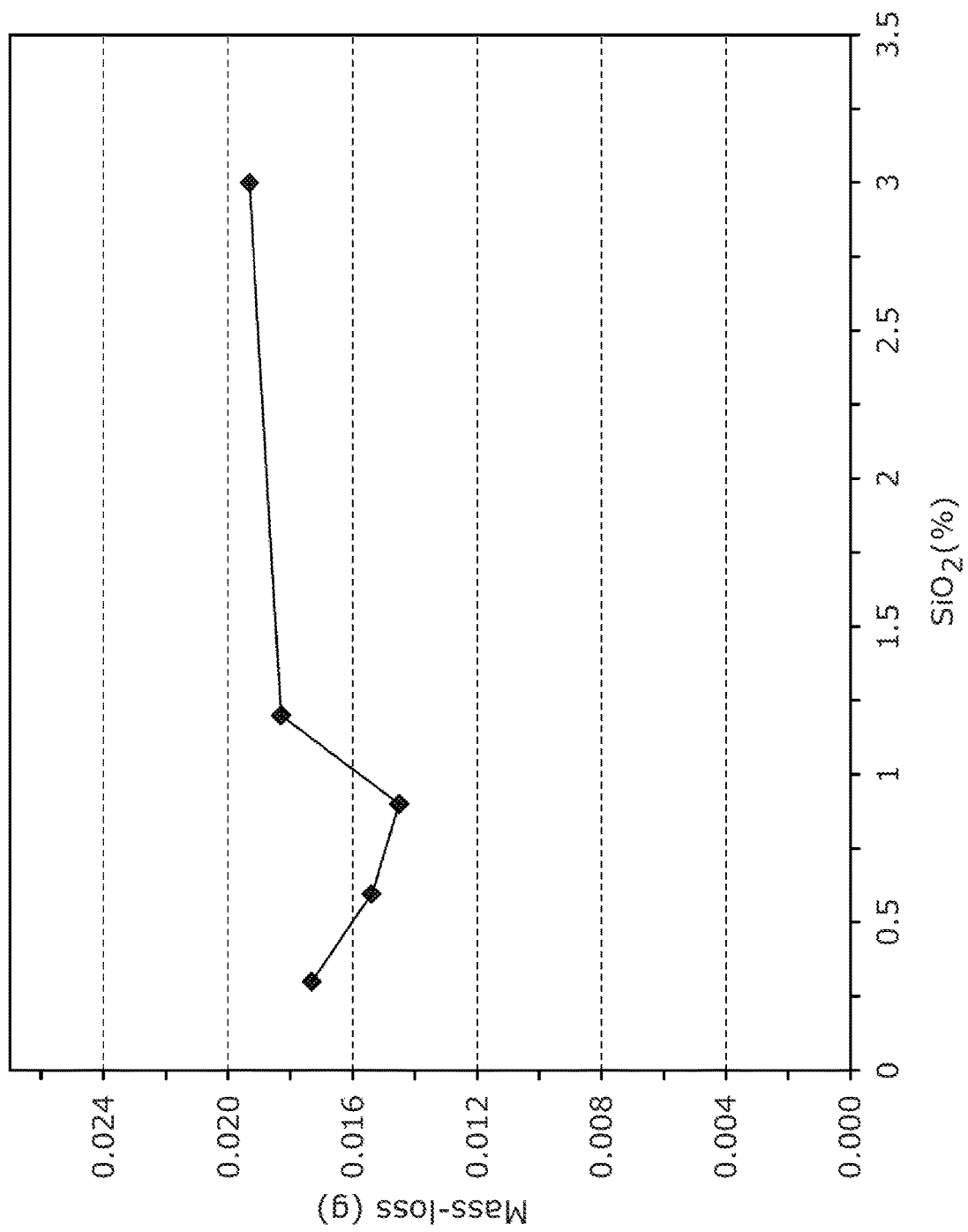
FIG. 3 is a graph showing the mass-loss after 2750 hours for five samples of coated large crystal titania as obtained in Example 3 when tested in acrylic melamine formaldehyde based paint, with the results being plotted with respect to the level of silica coating on the particles.

FIG. 3 shows the mass-loss after 2750 hours for the five samples of coated large crystal titania when tested in the acrylic melamine formaldehyde based paint.

The product with the 3% silica coating and 2% alumina coating gave the worst result. However, it is noted that this product having a large crystal size (average crystal size of 1 micron) still gave better results than the commercial product, which had the same coating but a conventional crystal size. The sample using commercial product showed a mass-loss after 2750 hours when tested in the acrylic melamine formaldehyde based paint of 0.048 g (i.e. so high as to be off the y-axis of FIG. 3).

The silica coating levels of 0.3, 0.6, 0.9 and 1.2% (each with 2% alumina) all gave better results than the product that had silica coated at a 3% level (with 2% alumina), which is the conventional level of silica coating.

It can be seen that the results for the sample with the 0.9% level of silica coating gave the best result. Therefore it was not the highest level of coating or the lowest level of coating that gave the best result. Instead, there clearly is a range within which the best results are achieved.

The best result, at a 0.9% coating level, was followed by the 0.6%, then the 0.3% and then the 1.2% coating levels.

This therefore reinforces the surprising finding that using lower amounts of coating can lead to improved effects.

It would not have been predicted that there would be an optimal range of coating level, to get the best results in terms of reduced photocatalytic effect for the particles and therefore less mass-loss, where this optimal range involves use of coating amounts that are less than half the conventional coating level.

Figure 4:
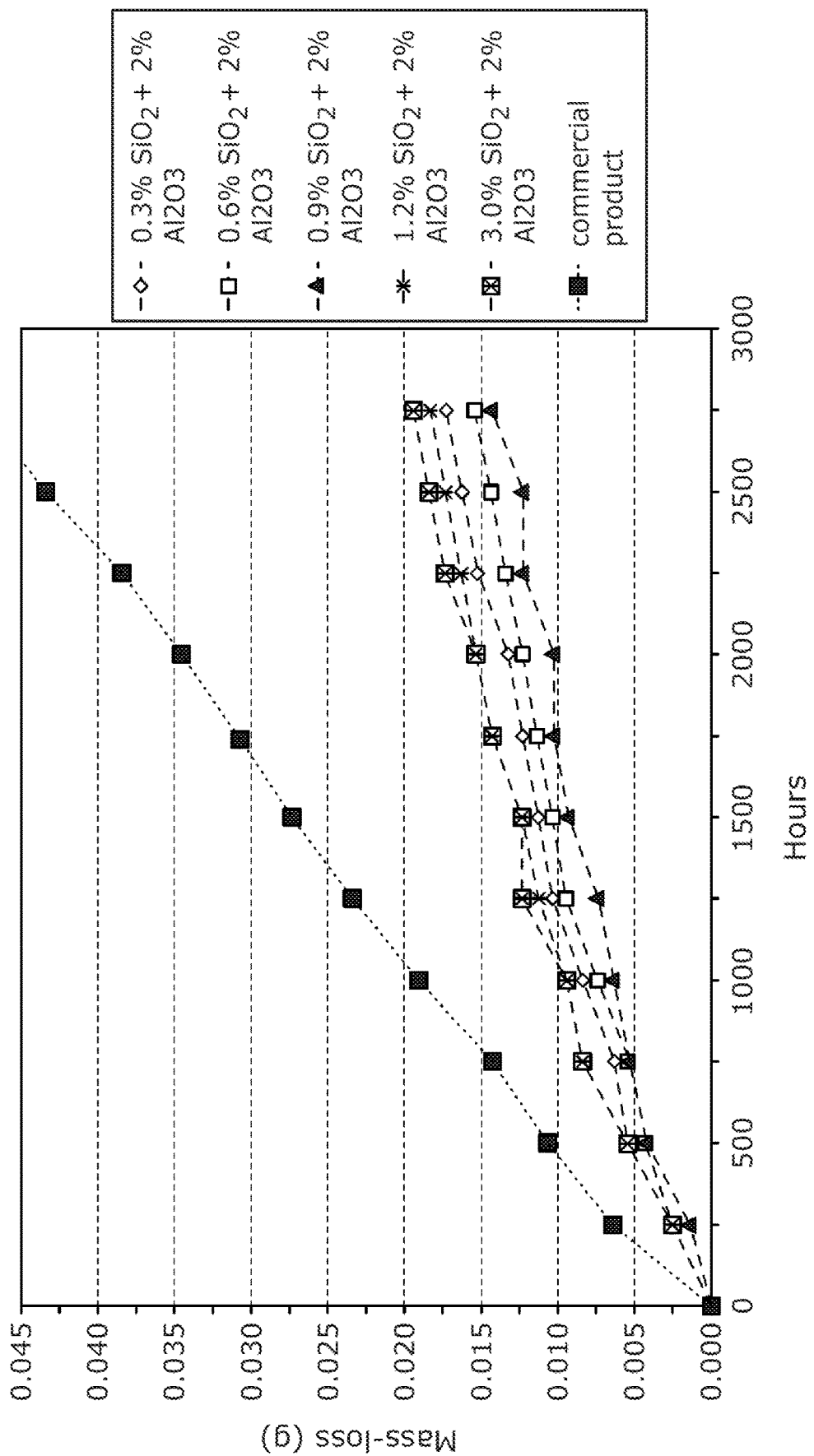
FIG. 4 is a graph showing the mass-loss over time for six samples of coated titania as obtained in Example 3 when tested in acrylic melamine formaldehyde based paint.

FIG. 4 shows the mass-loss over time for the six samples when tested in the acrylic melamine formaldehyde based paint.

The products with the 3% silica coating and 2% alumina coating gave the worst results. However, out of these two products, the product having a large crystal size (average crystal size of 1 micron) gave better results than the commercial product, which had the same coating but a conventional crystal size.

The silica coating levels of 0.3, 0.6, 0.9 and 1.2% (each with 2% alumina) all gave better results than the product that had silica coated at a 3% level, which is the conventional level of coating.

It can be seen that the results for the sample with the 0.9% level of silica coating gave the best result. Therefore it was not the highest level of coating or the lowest level of coating that gave the best result. Instead, there clearly is a range within which the best results are achieved.

The best result, at a 0.9% coating level, was followed by the 0.6%, then the 0.3% and then the 1.2% coating levels.

This therefore reinforces the surprising finding that lower amounts of coating, within the claimed range, can lead to improved effects and more photostable systems.

It would not have been predicted that there would be an optimal range of coating level, to get the best results in terms of more photostable systems, where this optimal range involves use of coating amounts that are less than half the conventional coating level.

Example 4

4.1 Preparation of Coated $TiO_2$ Particles $TiO_2$ particles with an average crystal size of 1 micron were prepared in accordance with section 1.1.

4.2 Preparation of the Coated Particulate Inorganic Material

Coatings were applied to the $TiO_2$ particles with an average crystal size of 1 micron in accordance with the general principles of section 1.2.

The coating levels prepared were as set out in Table 3.

TABLE 3

| Sample | First layer | | | Second layer |
| | $SiO_2$ | $P_2O_5$ | $CeO_2$ | $Al_2O_3$ |
| --- | --- | --- | --- | --- |
| 1 | 3.0 | 0 | 0 | 2.0 |
| 2 | 1.0 | 0 | 0 | 2.0 |
| 3 | 0 | 1.0 | 0 | 3.0 |
| 4 | 0 | 1.0 | 0.1 | 3.0 |

In order to apply the coatings, the following method was used:

An aqueous slurry of the titanium dioxide particles (concentration of 350 g/l) was heated with stirring to 60° C. Sufficient sulfuric acid was added over 5 minutes to reduce the pH of the suspension below 2.0, whereupon a further 5 minutes of mixing stabilized the pH. At this point 0.1% (wt/wt on TiO2) of $CeO_2$ (as 0.1 M cerium (IV) sulfate solution) was added over 1 minute. The slurry was again stirred for 5 minutes before 1.0% $P_2O_5$ (as mono ammonium phosphate) was added over 30 minutes.

A further 30 minutes of stirring was succeeded by addition of 1.5% $Al_2O_3$ (as aluminum sulfate solution) over 30 minutes to reach a pH below 2.5. This pH was stabilized by a further 30 minutes of stirring. At this point a further 1.5% $Al_2O_3$ (as caustic sodium aluminate solution) was added over 30 minutes to raise the pH of the suspension to around 7.0. The resulting neutral suspension was filtered, washed and dried, before being fluid energy milled to yield four batches of coated product. Each product was a white pigment in powder form.

4.3 Production of Paint

The four batches of coated titania were then each incorporated into an alkyd melamine formaldehyde based paint, as in section 3.3.

4.4 Durability

Durability was measured using an Atlas Ci65a Weather-Ometer®. The testing was carried out in accordance with Appendix 2 below. The durability ratio (rate of mass-loss of the test pigment relative to that of a standard pigment) was calculated in each case.

Results

The durability ratio (DR) values are set out in Table 4 below:

TABLE 4

| Sample | DR |
|---|---|
| 1 | 0.835 |
| 2 | 0.737 |
| 3 | 0.655 |
| 4 | 0.664 |
| Commercial product | 0.911 |

It can therefore be seen that the products all gave better durability results than the durability standard (Calais TR92 TS45203), as shown by the DR values being below 1. As the skilled person will appreciate, a DR of 1 means that the durability is that same as the durability standard.

In addition, all of the large crystal based samples showed durability ratios in the alkyd melamine formaldehyde based paint that are better than the "superdurable" commercial product.

Overall, those products with lower levels of coating gave better durability. The best results across the tests were from the products that had coatings of 1% $SiO_2$ and 2% $Al_2O_3$%, 1% $P_2O_5$, 0.1% $CeO_2$ and 3% $Al_2O_3$, and 1% $P_2O_5$ and 3% $Al_2O_3$. Therefore the products where the first coating layer is present at about a 1% level are optimal.

In general, having an amount of first coating layer in the range of from 0.1 to 2.2% w/w, such as from 0.3 to 1.2%, and especially at a level of about 0.3 to 1.1%, gives the optimal results. Having an amount of the second layer of 0.1 to 3.5% w/w, such as from 0.3 to 3.3% and especially at a level of 0.4 to 3.2% gives the optimal results. Having a total amount of coating from 0.2 to 4.5% w/w, such as from 0.5 to 4.3% and especially from 1 to 4.2%, gives the optimal results.

Therefore, surprisingly, the application of relatively low coating levels gives rise to greater durability for the large crystal size products.

Summary of Results

The use of a coating system that uses a first layer and a second layer, with the first layer being an effect coating with anti-photocatalytic properties (e.g., silica) and the second layer being an alumina coating, is surprisingly more effective in terms of achieving durability when the amount of effect coating (both in terms of the amount of the first layer of coating and in terms of the total amount of coating) is within a specific range that is relatively narrow.

Good results are seen when the amount of the first layer on the particulate inorganic material is from 0.1 to 2.2% w/w, when considering the total weight of the first layer material with respect to the total weight of the particulate inorganic material, and especially when the amount is from 0.2 to 1.5% w/w, such as from 0.3 to 1.3% w/w.

The best results are seen for amounts of the first layer in the range of 0.3 to 1.1% w/w, such as from 0.3 up to 1% w/w; or from 0.4 up to 1.1% w/w, such as from 0.4 up to 1% w/w; or from 0.5 up to 1.1% w/w, such as from 0.5 up to 1% w/w.

In this coating system, to see the best results, the total amount of coating is from 0.2 to 4.5% w/w, when considering the total weight of the first and second layer material with respect to the total weight of the particulate inorganic material; especially in the range of from 0.5 to 4.5% w/w, such as from 1 to 4.3% w/w or from 1.2 to 4.2% w/w.

Reference Example 5

This reference example, which is not within the scope of the present invention, further illustrates that the technical effects associated with the present invention are surprising and unexpected.

Specifically, for a smaller, conventionally sized (0.3 micron) particle an increase in the amount of coating leads to better durability. This contrasts to the present invention, whereby when a coating system that uses a first layer and a second layer, with the first layer being an effect coating with anti-photocatalytic properties (e.g., silica) and the second layer being an alumina coating, is applied to non-conventionally sized particles, i.e., those with a large crystal size, the durability is greater when the amount of effect coating is within a specific range that is relatively narrow and relatively low.

In this reference example commercial titania products each having a crystal size of 0.3 microns were tested. The first had 0 w/w % silica coating and a 2 w/w % alumina coating. The second had a 3 w/w % silica coating and a 2 w/w % alumina coating. The third had a 5 w/w % silica coating and a 2 w/w % alumina coating.

In addition, analogous products to the second product in terms of coating levels but with a crystal size of 0.7 microns and with a crystal size of 1 micron were prepared.

The five batches of coated titania were then each incorporated into a polyester melamine formaldehyde paint.

The polyester melamine formaldehyde paints were made using the method of Appendix 1 below. The pigment samples were incorporated at a 21% volume fraction in the polyester melamine formaldehyde resin system.

The paints as made were applied to test panels and then Florida-weathered for 57 months. At regular intervals the panels were rated for gloss using a commercial glossmeter (e.g., with an ASTM D 523 standard measurement protocol).

Figure 5:
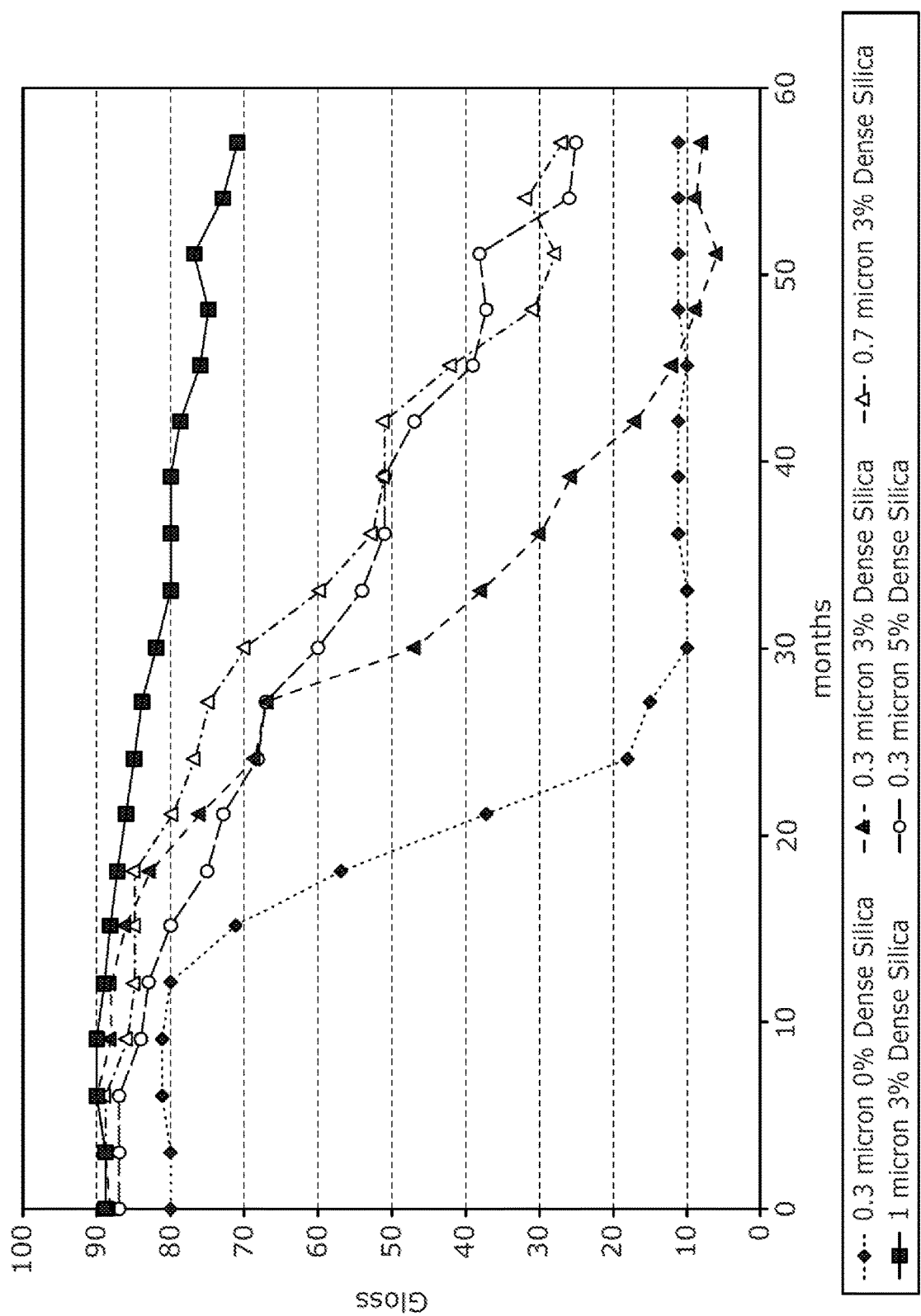
FIG. 5 is a graph showing the gloss properties over time for each of the five samples of titania as obtained in Example 5 when tested in polyester melamine formaldehyde paint.

FIG. 5 shows the gloss properties as measured over time for each of the five samples.

It can be seen that for the three samples where the crystal size is a conventional 0.3 microns, an increase in the coating level from 3 to 5% leads to a better retention of gloss properties over time under the weathering conditions. In particular, beyond a time frame of 30 months, the benefit of the 5% silica coating as compared to 3% is marked.

It can also be seen that there is a benefit from having a larger size particle. Having the same (3% silica 2% alumina) coating but increasing the particle size from 0.3 microns to 0.7 microns to 1 micron clearly leads to an improvement in the retention of gloss properties over time.

There would therefore be an expectation that both thicker coatings and larger particle sizes would lead to the best results. (The benefit from larger size which could be interpreted as benefits from thicker coatings, since specific surface area is inversely proportional to size).

It is against this background that the benefits of using thinner coatings at a given larger particle size are most surprising.

It would not have been expected that for large size particles which have an average crystal size of from 0.4 μm to 2 μm the best effect in terms of reducing photocatalytic activity/increasing durability would not be achieved by applying a higher level of coating, but instead that a much lower level of anti-photocatalytic coating can result in the product having an equivalent or lower photocatalytic activity as compared to use of a higher level of the inorganic oxide coating layer.

It would not have been predicted from the trends seen with conventionally sized particles that for a larger sized particle there would be an optimal range of coating level, to get the best results in terms of more photostable systems, where this optimal range involves use of coating amounts that are significantly less than the conventional coating levels used in the art.

APPENDIX 1—FORMULATIONS FOR PAINT MAKEUP

Alkyd Melamine Formaldehyde Formulation
Millbase 28.0 g of 15% Beetle BA 595 alkyd resin solution resin (as supplied by Cytec Industries Inc.) was weighed into a 250 ml glass jar. To this was added 68.0 g of the pigment under test and the jar was swirled until all the pigment was wetted. 170 g of 8 mm glass ballotini were added; the jar was shaken until the sides were covered with millbase, then placed on trundlers for 16 hours.

Preparation of Final White Paint

After 16 hours, the jar was removed from the trundlers and stabilized by the addition of 15.0 g of 60% Beetle BA 595 alkyd resin (as supplied by Cytec Industries Inc.). The jar was replaced on the trundlers for 30 minutes then made up with 24.3 g of 60% Beetle BA595 alkyd resin and 15.3 g of 60% Cymel 651 melamine formaldehyde resin (partially n-butylated melamine resin in n-butanol/xylene solvent, as available from Allnex Belgium; used as supplied). The paint was returned again to the trundlers for at least 30 minutes before decanting to an unlacquered 250 ml tin, then left to de-aerate for at least 15 minutes.

The thus obtained paints were then applied to a metal substrate and cured for 30 minutes at 150° C.

Polyester Melamine Formaldehyde Formulation
Millbase

Into a 250 ml glass jar were weighed:—35.6 g of Uralac™ SN804 saturated polyester resin for topcoat (superdurable), (as available from DSM Powder Coating Resins), 0.4 g of Urad™ DD27 acrylic resin, (as available from DSM Powder Coating Resins), 12.3 g of Solvesso™ 150ND aromatic hydrocarbon solvent (as available from ExxonMobil) and 2.4 g of butylglycol. To this was added 69.1 g of the pigment under test. 170 g of 8 mm glass ballotini were added; the jar was shaken until the sides were covered with millbase and then placed on trundlers for 16 hours.

Preparation of Final White Paint

After 16 hours, the jar was removed from the trundle. 39.3 g of millbase was decanted into a jar and stabilised by the addition of 28.7 g of bulk make-up-medium.

The make-up-medium comprised:

| | |
|---|---|
| Uralac ™ SN804 | 18.20 g |
| Cymel ® 303 | 3.43 g |
| Nacure ® 1419 | 0.17 g |
| K-Cure ® 1040 | 0.03 g |
| Solvesso ™ 150ND | 4.73 g |
| Butylglycol | 2.14 g |

Uralac™ SN804 resin is a saturated polyester resin for topcoat (superdurable), as available from DSM Powder Coating Resins.

Cymel® 303 amine is a commercial grade of hexamethoxymethylmelamine supplied in liquid form at >98% non-volatile, which acts as a crosslinking agent and is available from Allnex Belgium.

Nacure® 1419 catalyst is a covalently blocked dinonylnaphthalenesulfonic acid (DNNSA) catalyst available from King Industries.

K-CURE® 1040 catalyst is a solution of para-toluenesulfonic acid (p-TSA) in isopropanol available from King Industries.

Solvesso™ 150ND solvent is an aromatic hydrocarbon solvent, available from ExxonMobil.

The paint was returned again to the trundlers for at least 30 minutes before decanting to an unlacquered 250 ml tin, then left to de-aerate for at least 15 minutes.

The thus obtained paints were then applied to a metal substrate and cured for 10 minutes at 200° C.

PVDF-Acrylic Formulation
Millbase 43.0 g of 20% Paraloid™ B44 solid grade acrylic resin, (available from Dow) in toluene was weighed into a 250 ml glass jar. To this was added 69.0 g of the pigment under test and the jar was swirled until all the pigment was wetted. 170 g of 8 mm glass ballotini were added; the jar was shaken until the sides were covered with millbase, and then placed on trundlers for 16 hours.

Preparation of Final White Paint 33.7 g of the millbase was placed into a glass jar and 22.3 g of 40% Paraloid B44 in toluene was added whilst hand stirring. To this was added a pre-dispersed mixture of 27.0 g Kynar 500® (PVDF resin, available from Arkema) in 55.0 g of isophorone. The paint was then returned to the trundlers for 1 hour.

The thus obtained paints were then applied to a metal substrate, flashed-off overnight, and then cured for 10 minutes at 232° C.

Acrylic Melamine Formaldehyde Formulation
Millbase 28.0 g of 20% Synocryl® 826S acrylic resin solution (available from Arkema) was weighed into a 250 ml glass jar. To this was added 69.0 g of the pigment under test and the jar was swirled until all the pigment was wetted. 170 g of 8 mm glass ballotini were added; the jar was shaken until the sides were covered with millbase, and then placed on trundlers for 16 hours.

Preparation of White Paint

After 16 hours, the millbase jar was removed from the trundlers and stabilized by the addition of 14.0 g of 60% Synocryl® 826S acrylic resin. The jar was replaced on the trundlers for 30 minutes then made up with 62.2 g of 60% Synocryl® 826S acrylic resin (as supplied) and 28.8 g of 60% Cymel® 651 melamine formaldehyde resin (available from Allnex Belgium) (as supplied). The paint was returned again to the trundlers for at least 60 minutes before decanting to an unlacquered 250 ml tin, then left to de-aerate for at least 15 minutes.

Preparation of Tint Concentrate

Into a 250 ml tin were weighed: 70 g of 60% Synocryl® 826S resin, 4.0 g of xylene:butanol and 8.0 g of Disperbyk 161 wetting and dispersing additive based on high molecular weight block copolymers (available from BYK Additives & Instruments). After stirring, 8.0 g of phthalocyanine blue 15:1 (supplied by Sun Chemicals) was added followed by 500 g of 6 mm steel ballotini. The mixture was then dispersed using a Red Devil shaker for a total of 60 minutes, shaking for 15 minute intervals and allowing a 10 minute cooling down period between each interval.

Preparation of Final, Tinted Paint

Into a 120 ml glass jar was weighed 50.0 g of white paint, followed 1.74 g of the tint concentrate. The mixture was then shaken vigorously before placing on trundlers for 3 hours.

The thus obtained paints were then applied to a metal substrate and cured for 30 minutes at 150° C.

APPENDIX 2—MEASUREMENT OF THE DURABILITY RATIO

The durability ratio was calculated from mass-loss data for the painted metal plates exposed in an Atlas Ci65a or Ci5000a Xenon Arc Weather-Ometer®. The mass-loss was recorded every 250 hrs. Total exposure times depended on the paint formulation and were as follows:

|  | Number of Hours |
| --- | --- |
| Alkyd melamine formaldehyde | 3000 |
| Polyester melamine formaldehyde | 5000 |
| PVDF-acrylic | 8000 |

Durability Ratio (DR) is calculated from the mass-loss (ml), expressed in g, for the test pigment. This is determined relative to that for the primary standard (with known DR), using the following equation:

DR(test)=ml(test)×DR(standard)/ml(standard)

The primary standard is Calais TR92 TS45203.

A higher value for the Durability Ratio thus means a greater mass-loss from the paint and therefore a more photochemically active pigment. Paints or inks which have good durability will have a lower Durability Ratio.

APPENDIX 3—ATTENUATION COEFFICIENTS FOR RESINS

The attenuation coefficients at 300 nm were calculated from the transmittance values at 300 nm and the film thickness.

| Transmittance | Glass Substrate | Acrylic MF | Alkyd MF | PVDF Acrylic | Polyester MF | |
| --- | --- | --- | --- | --- | --- | --- |
| 300 nm | 92 | 85 | 40 | 88 | 49 | |
| 310 nm | 92 | 87 | 82 | 89 | 58 | |
| 320 nm | 93 | 89 | 87 | 89 | 65 | |
| 330 nm | 92 | 90 | 88 | 89 | 69 | |
| 340 nm | 92 | 90 | 89 | 89 | 83 | |
| 350 nm | 93 | 91 | 90 | 90 | 89 | |
| 360 nm | 93 | 91 | 90 | 91 | 90 | |
| 370 nm | 93 | 91 | 90 | 91 | 90 | |
| 380 nm | 93 | 91 | 91 | 91 | 90 | |
| 390 nm | 93 | 91 | 91 | 91 | 91 | |
| 400 nm | 93 | 92 | 91 | 92 | 91 | |
| Film Thickness | 0 | 31 | 40 | 36 | 70 | Micron |
| Attenuation (300 nm) |  | 0.085 | 0.836 | 0.051 | 0.628 | Unitless |
| Attenuation Coefficient (300 nm) |  | 0.003 | 0.021 | 0.001 | 0.009 | per micron |

The numbers on the shaded background are transmittance values.

The value at 300 nm is used to calculate the attenuation of each film, using the formula:

Attenuation of film at 300 nm=$\mathrm{Ln}(T_{glass}/T_{glass+resin})$

The attenuation coefficient is then calculated by dividing the attenuation by the film thickness.

Specifically, $\mathrm{Ln}(I_0/I)=\varepsilon cl$ and therefore $\varepsilon = \{\mathrm{Ln}(I_0/I)\}/cl$ where $\varepsilon$ is the attenuation coefficient, $I_0$ is the transmittance intensity through glass, I is the transmittance intensity through glass+resin, 1 is the thickness and c is the resin concentration (=1).

The present invention is not limited to embodiments described herein; reference should be had to the appended claims.

What is claimed is:

1. A coated particulate inorganic material comprising:
   a particulate inorganic material selected from at least one of titanium dioxide and a doped titanium dioxide, the particulate inorganic material having an average crystal size of from 0.4 µm to 2 µm; and
   a coating on the particulate inorganic material, the coating comprising a first layer and a second layer,
   the first layer comprising at least one inorganic oxide and at least one inorganic phosphate,
     each of the at least one inorganic oxide being independently selected from an oxide of:
       group 4 (IVB) and group 12 (IIB) transition metals selected from Ti, Zr and Zn;
       group 13 to group 15 (IIIA-VA) p-block elements selected from Si, P and Sn; and
       lanthanides; and
     each of the at least one inorganic phosphate being independently selected from a phosphate of:
       group 1 (IA) alkali metals and group 2 (IIA) alkaline earth metals selected from H, Li, Na, K, Rb, Be, Mg, Ca and Sr;
       group 3 (IIIA) and group 4 (IVB) transition metals selected from Sc, Y, Ti and Zr; and
       group 13 to group 15 (IIIA-VA) p-block elements selected from Ga, In, Tl, Ge, Sn and Pb; and
   the second layer being alumina;
   wherein,
   the first layer on the particulate inorganic material is from 0.1 to 2.2% w/w based on a total weight of the first layer with respect to a total weight of the particulate inorganic material,
   the second layer on the particulate inorganic material is 0.1 to 3.5% w/w based on a total weight of the second layer with respect to the total weight of the particulate inorganic material, and
   the coating on the particulate inorganic material is from 0.2 to 4.5% w/w based on the total weight of the first layer and the total weight of the second layer with respect to the total weight of the particulate inorganic material.

2. The particulate material as recited in claim 1, wherein, the first layer comprises:
the at least one inorganic oxide independently selected from an oxide of Ti, Zr, Zn, Si, P, Sn and Ce, and
the at least one inorganic phosphate independently selected from a phosphate of Al, Ti, Zr, and Sn.

3. The particulate material as recited in claim 2, wherein the first layer comprises:
the at least one inorganic oxide independently selected from an oxide of Zr, Si, P, and Ce, and
the at least one inorganic phosphate independently selected from a phosphate of Zr.

4. The particulate material as recited in claim 3, wherein the at least one inorganic oxide of the first layer comprises a silica.

5. The particulate material as recited in claim 2, wherein the at least one inorganic oxide of the first layer comprises a silica.

6. The particulate material as recited in claim 2, wherein the at least one inorganic oxide of the first layer comprises a dense silica.

7. The particulate material as recited in claim 1, wherein,
the first layer on the particulate inorganic material is from 0.1 to 2% w/w based on the total weight of the first layer with respect to the total weight of the particulate inorganic material, or
the first layer on the particulate inorganic material is from 0.2 to 1.5% w/w based on the total weight of the first layer with respect to the total weight of the particulate inorganic material, or
the first layer on the particulate inorganic material is from 0.3 to 1.4% w/w based on the total weight of the first layer with respect to the total weight of the particulate inorganic material, or
the first layer on the particulate inorganic material is from 0.4 to 1.3% w/w based on the total weight of the first layer with respect to the total weight of the particulate inorganic material, or
the first layer on the particulate inorganic material is from 0.5 to 1.2% w/w based on the total weight of the first layer with respect to the total weight of the particulate inorganic material, or
the first layer on the particulate inorganic material is from 0.7 to 1.2% w/w based on the total weight of the first layer with respect to the total weight of the particulate inorganic material.

8. The particulate material as recited in claim 1, wherein,
the first layer on the particulate inorganic material is from 0.3 to 1.2% w/w based on the total weight of the first layer with respect to the total weight of the particulate inorganic material, or
the first layer on the particulate inorganic material is from 0.3 to 1.1% w/w based on the total weight of the first layer with respect to the total weight of the particulate inorganic material, or
the first layer on the particulate inorganic material is from 0.4 to 1.1% w/w based on the total weight of the first layer with respect to the total weight of the particulate inorganic material, or
the first layer on the particulate inorganic material is from 0.5 to 1% w/w based on the total weight of the first layer with respect to the total weight of the particulate inorganic material, or
the first layer on the particulate inorganic material is from 0.6 to 1% w/w based on the total weight of the first layer with respect to the total weight of the particulate inorganic material, or
the first layer on the particulate inorganic material is from 0.7 to 1% w/w based on the total weight of the first layer with respect to the total weight of the particulate inorganic material.

9. The particulate material as recited in claim 1, wherein,
the second layer on the particulate inorganic material is 0.2 to 3.5% w/w based on the total weight of the second layer with respect to the total weight of the particulate inorganic material, or
the second layer on the particulate inorganic material is 0.3 to 3.5% w/w based on the total weight of the second layer with respect to the total weight of the particulate inorganic material, or
the second layer on the particulate inorganic material is 0.4 to 3.2% w/w based on the total weight of the second layer with respect to the total weight of the particulate inorganic material, or
the second layer on the particulate inorganic material is 0.4 to 3.1% w/w based on the total weight of the second layer with respect to the total weight of the particulate inorganic material, or
the second layer on the particulate inorganic material is 0.5 to 3% w/w based on the total weight of the second layer with respect to the total weight of the particulate inorganic material.

10. The particulate material as recited in claim 1, wherein,
the coating on the particulate inorganic material is from 0.3 to 4.5% w/w based on the total weight of the first layer and the total weight of the second layer with respect to the total weight of the particulate inorganic material, or
the coating on the particulate inorganic material is from 0.5 to 4.5% w/w based on the total weight of the first layer and the total weight of the second layer with respect to the total weight of the particulate inorganic material, or
the coating on the particulate inorganic material is from 1 to 4.3% w/w based on the total weight of the first layer and the total weight of the second layer with respect to the total weight of the particulate inorganic material, or
the coating on the particulate inorganic material is from 1.2 to 4.2% w/w based on the total weight of the first layer and the total weight of the second layer with respect to the total weight of the particulate inorganic material, or
the coating on the particulate inorganic material is from 1.5 to 4.2% w/w based on the total weight of the first layer and the total weight of the second layer with respect to the total weight of the particulate inorganic material, or
the coating on the particulate inorganic material is from 1.6 to 4.1% w/w based on the total weight of the first layer and the total weight of the second layer with respect to the total weight of the particulate inorganic material.

11. The particulate material as recited in claim 1, wherein,
the coating on the particulate inorganic material is from 0.7 to 4.3% w/w based on the total weight of the first layer and the total weight of the second layer with respect to the total weight of the particulate inorganic material, or
the coating on the particulate inorganic material is from 0.8 to 4.2% w/w based on the total weight of the first layer and the total weight of the second layer with respect to the total weight of the particulate inorganic material, or the coating on the particulate inorganic material is from 1 to 4.1% w/w based on the total weight of the first layer and the total weight of the second layer with respect to the total weight of the particulate inorganic material, or the coating on the particulate inorganic material is from 1.5 to 3.5% w/w based on the total weight of the first layer and the total weight of the second layer with respect to the total weight of the particulate inorganic material, or the coating on the particulate inorganic material is from 1.5 to 3.3% w/w based on the total weight of the first layer and the total weight of the second layer with respect to the total weight of the particulate inorganic material, or the coating on the particulate inorganic material is from 1.6 to 3.2% w/w based on the total weight of the first layer and the total weight of the second layer with respect to the total weight of the particulate inorganic material.

12. A coated particulate inorganic material comprising:

a particulate inorganic material selected from at least one of titanium dioxide and a doped titanium dioxide, the particulate inorganic material having an average crystal size of from 0.4 μm to 2 μm; and a coating on the particulate inorganic material, the coating comprising a first layer and a second layer, the first layer comprising at least one inorganic phosphate which is selected from a phosphate of:
  group 1 (IA) alkali metals and group 2 (IIA) alkaline earth metals selected from H, Li, Na, K, Rb, Be, Mg, Ca and Sr,
  group 3 (IIIA) and group 4 (IVB) transition metals selected from Sc, Y, Ti and Zr, and
  group 13 to group 15 (IIIA-VA) p-block elements selected from Ga, In, Tl, Ge, Sn and Pb; and the second layer being alumina;

wherein, the first layer on the particulate inorganic material is from 0.1 to 2.2% w/w based on a total weight of the first layer with respect to a total weight of the particulate inorganic material, the second layer on the particulate inorganic material is 0.1 to 3.5% w/w based on a total weight of the second layer with respect to the total weight of the particulate inorganic material, and the coating on the particulate inorganic material is from 0.2 to 4.5% w/w based on the total weight of the first layer and the total weight of the second layer with respect to the total weight of the particulate inorganic material.

* * * * *